(12) United States Patent
Hasarchi et al.

(10) Patent No.: US 9,179,321 B2
(45) Date of Patent: Nov. 3, 2015

(54) DIGITAL CAPACITY CENTRIC DISTRIBUTED ANTENNA SYSTEM

(71) Applicant: AXELL WIRELESS LTD., Chesham Buckinghamshire (GB)

(72) Inventors: Abraham Hasarchi, Petach Tikva (IL); Amir Meir, Tel-Aviv (IL); Michael John George Lewis, Stockholm (SE)

(73) Assignee: AXELL WIRELESS LTD., Buckinghamshire (GB)

( * ) Notice: Subject to any disclaimer, the term of this patent is extended or adjusted under 35 U.S.C. 154(b) by 0 days.

(21) Appl. No.: 14/360,026

(22) PCT Filed: Aug. 8, 2013

(86) PCT No.: PCT/US2013/054143
§ 371 (c)(1),
(2) Date: May 22, 2014

(87) PCT Pub. No.: WO2014/026005
PCT Pub. Date: Feb. 13, 2014

(65) Prior Publication Data
US 2014/0269318 A1    Sep. 18, 2014

Related U.S. Application Data

(60) Provisional application No. 61/681,227, filed on Aug. 9, 2012.

(51) Int. Cl.
 *H04W 16/04* (2009.01)
 *H04W 88/00* (2009.01)
 *H04B 7/02* (2006.01)
(Continued)

(52) U.S. Cl.
CPC .............. *H04W 16/04* (2013.01); *H04B 7/024* (2013.01); *H04W 28/0205* (2013.01); *H04W 88/00* (2013.01); *H04W 16/10* (2013.01)

(58) Field of Classification Search
USPC .......................................... 370/235, 338, 345
See application file for complete search history.

(56) References Cited

U.S. PATENT DOCUMENTS

| 5,621,786 A | 4/1997 | Fischer et al. |
| 5,627,879 A | 5/1997 | Russell et al. |
| 5,642,405 A | 6/1997 | Fischer et al. |

(Continued)

FOREIGN PATENT DOCUMENTS

| EP | 2092363 B1 | 3/2013 |
| EP | 2327272 B1 | 6/2013 |

(Continued)

OTHER PUBLICATIONS

International Search Report dated Nov. 20, 2013, from the corresponding PCT/US2013/054143.

(Continued)

*Primary Examiner* — Edan Orgad
*Assistant Examiner* — Steven Willmore
(74) *Attorney, Agent, or Firm* — Katten Muchin Rosenman LLP

(57) ABSTRACT

Disclosed herein is an architecture for a Digital Capacity Centric Distributed Antenna System (DCC-DAS) that dynamically manages and distributes resources in different locations where there is demand for capacity. The DCC-DAS also allows for the routing of resources to other applications such as location finding devices, jamming devices, repeaters, etc.

27 Claims, 14 Drawing Sheets

(51) Int. Cl.
  *H04W 28/02* (2009.01)
  *H04W 16/10* (2009.01)

(56) References Cited

U.S. PATENT DOCUMENTS

| | | | |
|---|---|---|---|
| 5,644,622 A | 7/1997 | Russell et al. | |
| 5,657,374 A | 8/1997 | Russell et al. | |
| 5,809,422 A * | 9/1998 | Raleigh et al. | 455/449 |
| 5,852,651 A | 12/1998 | Fischer et al. | |
| 5,880,863 A | 3/1999 | Rideout et al. | |
| 5,922,051 A * | 7/1999 | Sidey | 709/223 |
| 6,112,086 A | 8/2000 | Wala | |
| 6,151,480 A | 11/2000 | Fischer et al. | |
| 6,205,133 B1 * | 3/2001 | Bexten | 370/343 |
| 6,308,085 B1 * | 10/2001 | Shoki | 455/562.1 |
| 6,657,993 B1 | 12/2003 | Casanova et al. | |
| 6,801,767 B1 * | 10/2004 | Schwartz et al. | 455/426.2 |
| 6,804,540 B1 | 10/2004 | Shepherd et al. | |
| 6,836,660 B1 | 12/2004 | Wala | |
| 7,103,377 B2 | 9/2006 | Bauman et al. | |
| 7,171,244 B2 | 1/2007 | Bauman | |
| 7,173,183 B2 | 2/2007 | McMahon et al. | |
| 7,194,275 B2 | 3/2007 | Bolin et al. | |
| 7,245,603 B1 * | 7/2007 | Lucidarme et al. | 370/338 |
| 7,398,106 B2 | 7/2008 | Conyers et al. | |
| RE40,564 E | 11/2008 | Fischer et al. | |
| 7,483,504 B2 | 1/2009 | Shapira et al. | |
| 7,539,509 B2 | 5/2009 | Bauman et al. | |
| 7,546,138 B2 | 6/2009 | Bauman | |
| 7,554,946 B2 | 6/2009 | Conyers et al. | |
| 7,574,234 B2 | 8/2009 | Conyers et al. | |
| 7,577,439 B2 | 8/2009 | Halonen | |
| 7,599,711 B2 | 10/2009 | Hermel et al. | |
| 7,668,153 B2 | 2/2010 | Zavadsky | |
| 7,688,135 B2 | 3/2010 | Kim et al. | |
| 7,761,093 B2 | 7/2010 | Sabat, Jr. et al. | |
| 7,805,073 B2 | 9/2010 | Sabat, Jr. et al. | |
| 7,822,148 B2 | 10/2010 | Shapira et al. | |
| 7,917,177 B2 | 3/2011 | Bauman | |
| 7,933,572 B1 | 4/2011 | Johnson | |
| 7,961,618 B1 | 6/2011 | Prasad et al. | |
| 7,961,689 B2 | 6/2011 | Stratford | |
| 8,005,050 B2 | 8/2011 | Scheinert et al. | |
| 8,005,152 B2 | 8/2011 | Wegener | |
| 8,009,613 B1 * | 8/2011 | Gunasekara et al. | 370/328 |
| 8,050,246 B2 | 11/2011 | Wala et al. | |
| 8,064,850 B2 | 11/2011 | Yang et al. | |
| 8,107,464 B2 | 1/2012 | Schmidt et al. | |
| 8,135,102 B2 | 3/2012 | Wiwel et al. | |
| 8,135,273 B2 | 3/2012 | Sabat, Jr. et al. | |
| 8,149,950 B2 | 4/2012 | Kim et al. | |
| 8,165,169 B2 | 4/2012 | Hedin et al. | |
| 8,174,428 B2 | 5/2012 | Wegener | |
| 8,194,597 B2 | 6/2012 | Feder et al. | |
| 8,224,266 B2 | 7/2012 | Liu et al. | |
| 8,274,332 B2 | 9/2012 | Cho et al. | |
| 8,306,563 B2 | 11/2012 | Zavadsky et al. | |
| 8,326,238 B2 | 12/2012 | Yang et al. | |
| 8,326,324 B2 | 12/2012 | Wu et al. | |
| 8,340,605 B2 | 12/2012 | Hou et al. | |
| 8,351,877 B2 | 1/2013 | Kim et al. | |
| 8,380,143 B2 | 2/2013 | Yang et al. | |
| 8,396,368 B2 | 3/2013 | Tarlazzi et al. | |
| 8,400,292 B2 | 3/2013 | Kummetz | |
| 8,401,499 B2 | 3/2013 | Kim et al. | |
| 8,412,206 B2 | 4/2013 | Kwon et al. | |
| 8,452,305 B2 | 5/2013 | Brisebois et al. | |
| 8,467,747 B2 | 6/2013 | Kim et al. | |
| 8,472,409 B2 | 6/2013 | Sun et al. | |
| 8,472,897 B1 | 6/2013 | Yang | |
| 8,472,963 B2 | 6/2013 | Caire | |
| 8,483,702 B2 | 7/2013 | Noriega et al. | |
| 8,509,347 B2 | 8/2013 | Kim et al. | |
| 8,542,768 B2 | 9/2013 | Kim et al. | |
| 8,548,403 B2 | 10/2013 | Kim et al. | |
| 2002/0075906 A1 | 6/2002 | Cole et al. | |
| 2002/0093926 A1 | 7/2002 | Kilfoyle | |
| 2003/0181221 A1 | 9/2003 | Nguyen | |
| 2003/0236067 A1 * | 12/2003 | Hasarchi et al. | 455/10 |
| 2004/0106435 A1 | 6/2004 | Bauman et al. | |
| 2005/0041968 A1 | 2/2005 | Takahashi | |
| 2005/0152695 A1 | 7/2005 | Sulzberger et al. | |
| 2006/0094470 A1 * | 5/2006 | Wake et al. | 455/562.1 |
| 2006/0209752 A1 * | 9/2006 | Wijngaarden et al. | 370/328 |
| 2007/0087756 A1 * | 4/2007 | Hoffberg | 455/450 |
| 2007/0253714 A1 | 11/2007 | Seeds et al. | |
| 2007/0274279 A1 * | 11/2007 | Wood et al. | 370/343 |
| 2008/0009244 A1 * | 1/2008 | Lee | 455/69 |
| 2008/0051129 A1 | 2/2008 | Abe et al. | |
| 2008/0058018 A1 * | 3/2008 | Scheinert | 455/562.1 |
| 2008/0124087 A1 | 5/2008 | Hartmann et al. | |
| 2008/0181282 A1 | 7/2008 | Wala et al. | |
| 2008/0194226 A1 * | 8/2008 | Rivas et al. | 455/404.2 |
| 2008/0225816 A1 | 9/2008 | Osterling et al. | |
| 2008/0232328 A1 * | 9/2008 | Scheinert et al. | 370/335 |
| 2008/0265996 A1 | 10/2008 | Kim et al. | |
| 2009/0005096 A1 * | 1/2009 | Scheinert | 455/513 |
| 2009/0029664 A1 | 1/2009 | Batruni | |
| 2009/0061939 A1 * | 3/2009 | Andersson et al. | 455/562.1 |
| 2009/0061940 A1 | 3/2009 | Scheinert et al. | |
| 2009/0085658 A1 | 4/2009 | Liu et al. | |
| 2009/0180423 A1 | 7/2009 | Kroener | |
| 2009/0180426 A1 | 7/2009 | Sabat et al. | |
| 2009/0285194 A1 | 11/2009 | Kim et al. | |
| 2010/0002626 A1 * | 1/2010 | Schmidt et al. | 370/328 |
| 2010/0002661 A1 | 1/2010 | Schmidt et al. | |
| 2010/0008669 A1 | 1/2010 | Rhy et al. | |
| 2010/0014494 A1 | 1/2010 | Schmidt et al. | |
| 2010/0177759 A1 * | 7/2010 | Fischer et al. | 370/345 |
| 2010/0177760 A1 | 7/2010 | Cannon et al. | |
| 2010/0178936 A1 | 7/2010 | Wala et al. | |
| 2010/0202356 A1 | 8/2010 | Fischer et al. | |
| 2010/0208777 A1 | 8/2010 | Ogaz | |
| 2010/0271957 A1 | 10/2010 | Stapleton et al. | |
| 2010/0296458 A1 | 11/2010 | Wala et al. | |
| 2010/0296816 A1 * | 11/2010 | Larsen | 398/116 |
| 2011/0028157 A1 | 2/2011 | Larsen | |
| 2011/0039497 A1 | 2/2011 | Hammarwall et al. | |
| 2011/0122772 A1 | 5/2011 | Stuart | |
| 2011/0122788 A1 | 5/2011 | Sombrutzki et al. | |
| 2011/0135308 A1 * | 6/2011 | Tarlazzi et al. | 398/79 |
| 2011/0141895 A1 * | 6/2011 | Zhang | 370/235 |
| 2011/0156815 A1 | 6/2011 | Kim et al. | |
| 2011/0158081 A1 | 6/2011 | Wang et al. | |
| 2011/0177827 A1 | 7/2011 | Crilly, Jr. et al. | |
| 2011/0201269 A1 * | 8/2011 | Hobbs et al. | 455/9 |
| 2011/0201368 A1 * | 8/2011 | Faccin et al. | 455/507 |
| 2011/0244785 A1 | 10/2011 | Scheinert | |
| 2011/0268449 A1 | 11/2011 | Berlin et al. | |
| 2011/0312359 A1 * | 12/2011 | Kolding et al. | 455/509 |
| 2012/0039254 A1 | 2/2012 | Stapleton et al. | |
| 2012/0039320 A1 | 2/2012 | Lemson et al. | |
| 2012/0039321 A1 | 2/2012 | Ghosh et al. | |
| 2012/0046038 A1 | 2/2012 | Gao et al. | |
| 2012/0069880 A1 | 3/2012 | Lemson et al. | |
| 2012/0076027 A1 * | 3/2012 | Akyildiz et al. | 370/252 |
| 2012/0106404 A1 | 5/2012 | Damnjanovic | |
| 2012/0106657 A1 | 5/2012 | Fischer et al. | |
| 2012/0134279 A1 | 5/2012 | Tamaki | |
| 2012/0134666 A1 | 5/2012 | Casterline et al. | |
| 2012/0135695 A1 | 5/2012 | Yang et al. | |
| 2012/0178483 A1 * | 7/2012 | Rosenau | 455/509 |
| 2012/0189074 A1 * | 7/2012 | Jin et al. | 375/267 |
| 2012/0207145 A1 | 8/2012 | Han et al. | |
| 2012/0257516 A1 * | 10/2012 | Pazhyannur et al. | 370/252 |
| 2012/0275530 A1 * | 11/2012 | Nazar et al. | 375/267 |
| 2012/0281565 A1 | 11/2012 | Sauer | |
| 2012/0314797 A1 * | 12/2012 | Kummetz et al. | 375/295 |
| 2012/0321314 A1 | 12/2012 | Oren et al. | |
| 2012/0322501 A1 | 12/2012 | Abouzid et al. | |
| 2013/0005375 A1 | 1/2013 | Chen | |
| 2013/0009707 A1 | 1/2013 | Kim et al. | |
| 2013/0017863 A1 * | 1/2013 | Kummetz et al. | 455/562.1 |
| 2013/0028218 A1 | 1/2013 | Chun et al. | |

(56) References Cited

U.S. PATENT DOCUMENTS

| | | | |
|---|---|---|---|
| 2013/0040676 A1 | 2/2013 | Kang et al. | |
| 2013/0045755 A1 | 2/2013 | Davis | |
| 2013/0050054 A1 | 2/2013 | Chan et al. | |
| 2013/0077713 A1 | 3/2013 | Kim et al. | |
| 2013/0079035 A1 | 3/2013 | Wala et al. | |
| 2013/0084886 A1* | 4/2013 | Crilly et al. | 455/456.1 |
| 2013/0095871 A1* | 4/2013 | Soriaga et al. | 455/503 |
| 2013/0114486 A1* | 5/2013 | Spedaliere et al. | 370/328 |
| 2013/0114963 A1* | 5/2013 | Stapleton et al. | 398/115 |
| 2013/0121703 A1 | 5/2013 | Kummetz et al. | |
| 2013/0122946 A1 | 5/2013 | Zhu | |
| 2013/0128760 A1 | 5/2013 | Fujishima et al. | |
| 2013/0128810 A1 | 5/2013 | Lee et al. | |
| 2013/0143598 A1 | 6/2013 | Srinivasan et al. | |
| 2013/0147550 A1 | 6/2013 | Yang et al. | |
| 2013/0150065 A1 | 6/2013 | Elliott et al. | |
| 2013/0236180 A1* | 9/2013 | Kim et al. | 398/72 |
| 2013/0243124 A1 | 9/2013 | Yang et al. | |
| 2013/0251066 A1 | 9/2013 | Kim et al. | |
| 2013/0272202 A1 | 10/2013 | Stapleton et al. | |
| 2013/0272696 A1* | 10/2013 | Palanisamy et al. | 398/25 |
| 2013/0315291 A1 | 11/2013 | Kim et al. | |
| 2013/0331136 A1* | 12/2013 | Yang et al. | 455/501 |
| 2013/0336370 A1* | 12/2013 | Jovanovic et al. | 375/214 |
| 2014/0024402 A1* | 1/2014 | Singh | 455/501 |
| 2014/0031047 A1* | 1/2014 | Jovanovic et al. | 455/446 |
| 2014/0057627 A1* | 2/2014 | Hejazi et al. | 455/424 |
| 2014/0072299 A1* | 3/2014 | Stapleton et al. | 398/45 |
| 2014/0161057 A1* | 6/2014 | Hejazi et al. | 370/329 |
| 2014/0162644 A1* | 6/2014 | Ou | 455/435.1 |
| 2014/0162664 A1* | 6/2014 | Stapleton et al. | 455/445 |
| 2014/0169794 A1* | 6/2014 | Notargiacomo | 398/96 |
| 2014/0233548 A1* | 8/2014 | Leizerovich et al. | 370/338 |

FOREIGN PATENT DOCUMENTS

| | | |
|---|---|---|
| KR | 2011085828 A | 7/2011 |
| WO | WO2011100219 A1 | 8/2011 |
| WO | WO2011123336 A1 | 10/2011 |
| WO | WO2012024349 A1 | 2/2012 |
| WO | WO2012033659 A1 | 3/2012 |
| WO | WO2012159303 A1 | 11/2012 |
| WO | WO2013003717 A2 | 1/2013 |
| WO | WO2013028197 A1 | 2/2013 |
| WO | WO2013029145 A1 | 3/2013 |
| WO | WO2013033199 A1 | 3/2013 |

OTHER PUBLICATIONS

"CDMA Co-Pilot Beacon Transmitter", Cellular Specialties, Inc.: Co-Pilot Beacon, Jun. 6, 2012.

Gary Williamson, "Increasing In-Building Capacity with WiFi Offload", NEXIUS, Apr. 25, 2012, pp. 1 to 3.

"Overcoming Barriers to Communication 3000 Distributed Antenna System", Pacific Wave Wireless Zinwave, In-Building Cellular and Wireless Technology, www.pactificwave-wireless.com, Jan. 23, 2012.

Hartmann, P., et. al., "Wideband fibre-agnostic DAS using pluggable analogue optical modules", IEEE Xplore Digital Library, Microwave Photonics, 2006. MWP '06. International Topical Meeting on, Oct. 2006, p. 1 of 1.

"Fiber Distributed Antenna Systems for Indoor and Outdoor-IONTM-Series", COMMSCOPE, Jan. 23, 2012.

"t-Series tHostR Quad-Band Headend Unit", Dali Wireless Inc., 2013.

"t-Series t30TM Quad-Band Low Power Remote Unit", Dali Wireless Inc., 2013.

"t-Series t43TM Dual-Band High Power Remote Unit", Dali Wireless Inc., 2013.

"NMS Network Management System", Dali Wireless Inc., 2013.

"CMS Capacity Management System", Dali Wireless Inc., 2013.

"Industry Applications Intelligent Solutions for Every Environment", Dali Wireless Inc., 2013, pp. 1-8.

"System Overview", Dali Wireless Inc., 2013, pp. 1-11.

The Dali Difference All Digital Smart RF RouterTM More Data Throughput with Less Equipment and Best Tool Cost of Ownership, Dali Wireless Inc., 2013, pp. 1-8.

"You're Heard, Loud and Clear. Installation and Operation Manual for the SBIII Digital Signal Booster Model 613-8", Bird Technologies Group, Manual Part No. 7-9485, Signal Booster III Digital Technology, pp. 1-28, Sep. 12, 2011.

International Preliminary Report on Patentability and Written Opinion of the International Searching Authority dated Feb. 10, 2015 from corresponding Application No. PCT/US2013/054143.

\* cited by examiner

ILLUSTRATION OF ANALOG TRANSFER FUNCTION OF EACH CELL RESOURCE

| | COLUMN 1 | COLUMN 2 | COLUMN 3 | COLUMN 4 |
|---|---|---|---|---|
| | DATA TRAFFIC MEASUREMENT VECTORS 902 | DATA TRAFFIC ESTIMATOR VECTORS 904 | PREDICTED PEAKS VECTORS 906 | CAPACITY DEMAND VECTORS 908 |
| RRU1 | $TM1(c1...cn)$ | $E1(c1...cn)$ | 0 | $CD1(c1...cn)$ |
| RRU2 | . | . | 0 | . |
| . | . | . | 0 | . |
| . | $TMJ(c1....cn)$ 902 | $EJ(c1...cn)$ | $EPj(0..ck...0)$ | . |
| . | . | . | 0 | . |
| . | . | . | 0 | . |
| . | . | . | 0 | . |
| RRU N | $TM(c1..cn)$ | $ER1(c1...cn)$ | 0 | $CDN(c1...cn)$ |

| | COLUMN 5 | COLUMN 6 | COLUMN 8 | COLUMN 9 |
|---|---|---|---|---|
| | TRANSCEIVER / CABLE CONSTRAINT 910 | CAPACITY ALLOCATION VECTORS 912 | CAPACITY PRIORITY VECTORS 914 | PRIORITIZED CAPACITY ALLOCATION VECTORS 916 |
| RRU1 | $CC1(MAXc\,1)$ | $CA1(c1...cn)$ | $CP1(c1...cn)$ | $CA1(c1...cn)$ |
| RRU2 | . | . | . | . |
| . | . | . | . | . |
| . | . | . | . | . |
| . | . | . | . | . |
| . | . | . | . | . |
| RRU n | $CCn(MAXc\,n)$ | $CAn(c1...cn)$ | $CPn(c1...cn)$ | $CAn(c1...cn)$ |

DYNAMIC CAPACITY ALLOCATION PROCESS FOR ONE SECTOR

FIGURE 9

|      | COLUMN 1<br>DATA TRAFFIC<br>MEASUREMENT 902 | COLUMN 2<br>DATA TRAFFIC<br>ESTIMATOR 904 | COLUMN 3<br>PREDICTED PEAKS<br>VECTOR 906 | COLUMN 4<br>CAPACITY<br>DEMAND VECTOR<br>908 |
|---|---|---|---|---|
| RRU1 | TM1(c1...cn) | E1(c1...cn) | 0 | CD1(c1...cn) |
| RRU2 | . | . | 0 | . |
| . | . | . | 0 | . |
| . | TMj(c1....cn) | . | EPj(cj) | . |
| . | . | . | 0 | . |
| . | . | . | 0 | . |
| . | . | . | 0 | . |
| RRU n | TM(c1...cn) | E1(c1...cn) | 0 | CD1(c1...cn) |

|      | COLUMN 5<br>CAPACITY CONSTRAINTS<br>VECTOR 1105 | COLUMN 6<br>CAPACITY<br>ALLOCATION VECTOR<br>912 | COLUMN 7<br>CAPACITY OFFLOAD<br>RESOURCES 1102 | COLUMN 8<br>CAPACITY<br>ALLOCATION<br>VECTOR 1104 |
|---|---|---|---|---|
| RRU1 | CC1(c1...cn) | CA1(c1...cn) | 0 | CP1(c1...cn) |
| RRU2 | . | . | 0 | . |
| . | . | . | 0 | . |
| RRU j | CCj (CRDj, IPDj) | . | OLj( 0..Ok..Wi) | . |
| . | . | . | 0 | . |
| . | . | . | 0 | . |
| . | . | . | 0 | . |
| RRU n | CCn(c1...cn) | CAn(c1...cn) | 0 | CPn(c1...cn) |

CAPACITY ALLOCATION WITH OFF-LOAD CAPABILITY

FIGURE 11

TABLE 1300

| | RRU-1 | RRU-2 | RRU-3 | ..... | RRUn-1 | RRU-N |
|---|---|---|---|---|---|---|
| RRU1 | - | IS12 | | | | |
| RRU2 | IS21 | - | | | | |
| RRU3 | IS31 | IS32 | - | | | |
| | | | | $ISij(c1...cn)$ | | |
| | | | | | | |
| | | | | | - | |
| RRU-N | | | | | RRUn,n-1 | - |

RRU CROSS ISOLATION MATRIX

FIGURE 13

TABLE 1400

| | MACRO NETWORK SIGNAL DETECTED |
|---|---|
| RRU -1 | |
| RRU 2 | |
| | |
| | |
| RRU -j | $MSj (c1....cn)$ |
| | |
| RRU -N | |

OUTDOOR PENETRATION TABLE

FIGURE 14

DIGITAL CAPACITY CENTRIC DISTRIBUTED ANTENNA SYSTEM

CROSS-REFERENCE TO RELATED APPLICATIONS

The present application claims priority to U.S. Provisional Application Ser. No. 61/681,227, filed Aug. 9, 2012, the entire contents of which are hereby incorporated by reference.

BACKGROUND OF THE INVENTION

The worldwide in-building coverage market (IBW), or Distributed antenna system (DAS), as it is frequently called, has been constantly growing in the past few years. It is quickly becoming the major arena in which mobile operators' revenues are generated. Most of the calls and data transfers are now generated inside buildings and constitute around 80% of the operators' revenues.

In parallel to that, and due to the intensive use of smart phones, tablets, etc., data carrying capacity is quickly becoming a valuable and scarce resource. The demand for capacity has been constantly growing at a huge rate of around 100% per year. This means that a DAS system installed today will require twice the capacity a year from now and will require 8 times more capacity three years from now.

The aforesaid facts are valid not only for indoor DAS but also for outdoor DAS's particularly when serving multiple operators in confined areas such as campuses, stadiums etc.

Current indoor and outdoor DAS systems are predominantly coverage centric. The capacity is evenly and rigidly distributed and is not dynamically controlled as one would expect from such a valuable scarce resource. Any growth in capacity or reallocation of capacity requires a major redesign of the DAS system and a change of installation. It is difficult to integrate multiple technologies and multiple operators while making the DAS provide a cost effective specific frequency response (transfer function) for each technology and each operator. Trying to locate a mobile user inside a building or a campus is almost impossible since there are no GPS signals inside buildings.

Thus, there clearly is a need for a DAS addressing the current needs of DAS systems.
Adapt the DAS to Meet Continuously Growing Demands for Capacity Since the demand for capacity has been constantly growing and is expected to grow even more in the future, there is a need for a DAS with a flexible architecture that will provide the ability to easily and constantly adapt to the growing demand for capacity without the need to perform major redesigns and changes in installations.
Easy Integration of Multiple Wireless and Broadband Technologies There are now multiple technologies dealing with the capacity issue such as 3G/4G and other broadband technologies such as Small Cell and Wi-Fi that enable offloading of capacity from the macro cellular networks. There is a need for a DAS that will be able to easily and cost effectively integrate all these technologies into one system while still providing an individual frequency response (transfer function), specific routing scheme, and power level to each technology, each frequency sub-band, and each operator. There is a need to be able to differentiate between the various technologies so that the system can route specific cell resources of specific technologies to certain locations in the building where capacity is currently needed.
Dynamic Capacity Allocation Current DAS systems are predominantly coverage centric. The capacity is evenly distributed across the entire building/campus area. Current approaches to addressing this need rely on installing "small cells" as close as possible to the mobile user. This generates small coverage spots and enables a reuse of spectral resources. However this way of distributing capacity is rigid and once capacity is allocated there is no way to reallocate capacity from one location to another except without reinstalling the small cells.

Since the demand for capacity is not always static, both in the time domain and also in the location domain, it becomes prudent to adopt a new approach which deals with the scarce capacity resources as a common pool of resources which can be transferred to wherever is currently mostly needed. In a way, it is similar to queuing theory in which all customers are forming one queue and whenever there is a resource available a customer is directed to this resource. This approach of treating the resources as one pool is far more efficient than generating several "queues" as used to be in the past. The central pool of capacity may also take into consideration the various offload devices installed in the building when allocating capacity to various zones in the building.
In Building Location Based Services.

The need to locate a mobile user has two reasons.

1. Security reasons—Many countries are now mandating that the operator should be able to locate the mobile user when the user dials E911 or an equivalent number.

2. Commercial reasons—The operators want to leverage the location information in order to broadcast advertisements, promote sales etc.

Location finding can be easily achieved when the user is outdoors, particularly nowadays when most mobile phones are equipped with GPS devices. However this capability cannot be achieved inside building areas in which no GPS signals are available. The operator may know that the mobile user is in the building/campus based on a BTS report, however he cannot tell in which floor or area he is in. There is a need to locate the user to a greater accuracy.
Preventing Cellphone Use in Certain Building Locations In certain buildings or outdoor environments, there is often a need to mask or jam certain areas so as to prevent the users from generating calls in those specific areas, while at the same time enable calls in other areas of the building or the outdoor environment. This need may occur in theatres, cinemas, hospitals, prisons, schools with exam rooms, etc.

SUMMARY OF THE INVENTION

The system architecture for the Digital Capacity Centric DAS (DCC-DAS) provides a response to all the new market needs as aforementioned. The DCC-DAS integrates multiple resources of capacity, such as Cellular 2G/3G/4G resources, public safety resources, small cell, and broadband resources into one integrated operational system that is able to centrally manage its capacity resources and distribute them accordingly.

The system architecture consists of the following elements:
Base Transceiver Station (BTS) Farm The BTS farm is the main resource of capacity within the DCC-DAS. The BTS farm consists of various BTS's covering multiple technologies. The different BTS's may have RF output or a CPRI/OBSAI fiber interface. Other technologies, such as small cells and Wi-Fi access points, can be integrated with the BTS farm to provide offload capacity and can be installed either in the central BTS farm or in remote zones in a building.

Multiband & Technology Digital Interface (MTDI)

The MTDI may passively combine all the RF signals coming from the various RF BTS's in the BTS farm and adjust the level of these signals to the working level required by the MTDI digital processors. If the number of BTS's and technologies is higher than the maximum that can be handled by a single MTDI, then a number of additional MTDIs may be deployed. The MTDI may then convert the incoming RF signal to an intermediate frequency (IF) and then digitize the IF signal. In some embodiments, the MTDI may filter each of the incoming digitized signals using a digital filter bank with specific digital filters with each one of them matched to the technology and the bandwidth of a corresponding BTS cell resource. The output of each digital filter creates a digital stream of data which can be individually identified when combined with other similar streams of data. The streams of data are combined and passed to a Multi Sector Digital Hub (MSDH) for routing/processing.

In the uplink direction, the MTDI performs the reverse operation. The MTDI receives digital streams of data samples representing the cellular uplink channels received from the Remote Radio Units (RRUs) through the MSDH and converts them to RF uplink signals that are sent to the various BTS's in the BTS farm.

There are three functionally different MTDI modules: RF MTDIs that interface with RF BTS's; digital MTDIs that interface with digital BTS's (for example CPRI interface); and auxiliary MTDIs that interface with auxiliary equipment.

Multi Sector Digital Hub

The MSDH is the central hub of the DCC-DAS. It gets all the digital streams of data from the MTDI's and routes them to the various Remote Radio Units (RRUs) of the DCC DAS. In the uplink, it does the reverse operation. It gets all the digital data coming in the Uplink from the Remote Radio Units and directs it to the relevant MTDI and from there to the relevant BTS. Uplink data from different RRUs for the same frequency band going to the same MTDI and BTS are summed together at the MSDH before being sent to the MTDI. The MSDH is responsible for managing and routing all of the capacity resources for the DCC-DAS, including those in the BTS farm as well as those in remote zones, like small cells. The MSDH can also be leveraged to manage and route auxiliary resources like off-air repeaters, FM Radios, public safety BTS's, and BTS emulators (for location finding purposes). For example, the MSDH can be used to direct specific external resources like repeater or FM radio signals, or any other external resource, to specific locations in the building served by the DCC-DAS. The MSDH can also be used to direct jamming resources to specific locations in the building in which cellular calls are prohibited. Further, the MSDH is modular and can be connected to a slave MSDH which covers other portions of a building/campus. Multiple interconnected MSDHs form a single overall MSDH function, where the interconnections between them perform part of the overall MSDH routing function. The MSDHs may be interconnected in different topologies, such as star, ring or tree, depending on the implementation and the routing requirements.

In the downlink direction, the MSDH receives the digital streams of data from the MTDIs and routes them to the proper remote radio unit (RRU). In the uplink direction, the MSDH performs the reverse operation. The MSDH receives data from the RRUs and directs it to the relevant MTDI from which it is then sent to the relevant BTS.

The MSDH also routes Ethernet data which is the IP backhaul required for the operation of the Small Cell and Wi-Fi access devices and routes that data to an internet gateway or a virtual private network (VPN) gateway.

Remote Radio Units

Each RRU is a multiple band multiple technology digital repeater. In the downlink direction, the RRU receives digital streams of data (digitized signals) from the MSDH, converts them from baseband to RF, and transmits them to a certain zone in the building or an outdoor environment. A zone is defined as the geographical area covered by a single output of an RRU (Although in certain situations one or more RRUs may share the same zone particularly when there are many frequency bands that cannot be fit into one RRU or in MIMO applications where more than one RRU will be required to cover the same zone). Since the RRU may be connected to one or more antennas, a zone may be the area covered by one or more antennas which are all connected to one RRU output.

In the uplink direction, the RRU receives mobile unit signals from, for example, the mobile user cellphone or first responder's mobile unit, etc., converts them to IF signals, digitizes the IF signals, filters them in a digital filter bank which may be similar to the one in the MTDI, and passes them to the MSDH.

DAS Controller

The DAS controller stores and controls the various configurations of the DCC-DAS. Additionally, the DAS controller allows a user to manage the various configurations of the DCC-DAS via a user interface. The DAS controller may be integrated into the MSDH, or may be a separate unit.

BRIEF DESCRIPTION OF THE DRAWINGS

FIG. 9 depicts the structure of a dynamic capacity allocation vectors for one sector.

FIG. 11 depicts the structure of a dynamic capacity allocation vector with offload capacity.

FIG. 13 depicts the structure of the RRU's isolation matrix.

FIG. 14 depicts macro network signal levels received in each digital filter in the filter bank

DETAILED DESCRIPTION OF THE INVENTION

Figure 1:
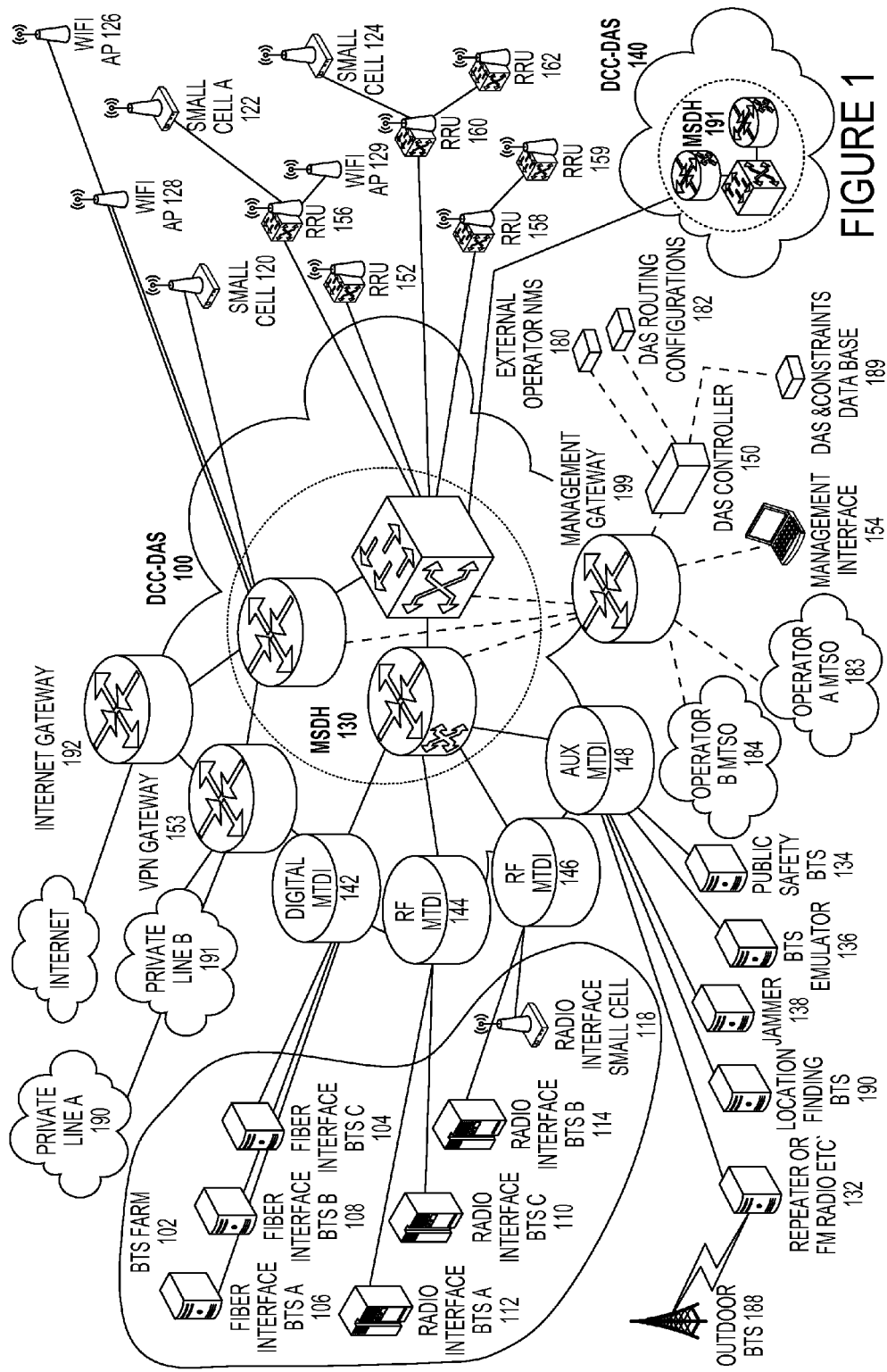
FIG. 1 depicts a block diagram of an embodiment of the DCC-DAS serving multiple sectors.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

FIG. 1 depicts a function block diagram of DCC-DAS 100 according to an exemplary embodiment of the invention. DCC-DAS 100 provides a response to all the aforementioned current market needs for DASs. DCC-DAS 100 integrates multiple resources of capacity, such as Cellular 2G/3G/4G resources, public safety resources, small cell, and broadband resources into one integrated operational system that is able to centrally manage its capacity resources and distribute them accordingly.

BTS farm 102 is the main resource of capacity of DCC-DAS 100. BTS farm 102 comprises various BTS's covering multiple technologies. Digital Fiber interface BTS's 104, 106, and 108 have digital baseband fiber interface (For example CPRI data) outputs whereas Radio Interface BTS's 110, 112, 114 and radio interface small cell 118 have Radio RF outputs.

Other capacity resources, like small cells 118, 120, 122, and 124 or Wi-Fi access points 126, 128 and 129 can be used by DCC-DAS 100 for offloading capacity purposes. They can be installed either in BTS farm 102, like small cell 118, or in remote zones, like small cells 120, 122, and 124 and WIFI access points 126, 128, and 129. MSDH 130 manages all the capacity resources of DCC-DAS 100. DCC-DAS 100 can be leveraged to manage auxiliary resources like off-air repeaters (Off air repeater receives the signal from remote BTS 188) or FM Radios 132, public safety BTS 134, and BTS emulator 136 for location finding purposes.

DCC-DAS 100 can be used to direct the signal from jammer 138 to specific zones in which cellular calls are prohibited. As depicted in FIG. 1, DCC-DAS 100 is modular and can be connected to slave MSDH 191 and/or slave DCC-DAS 140 which covers other zones not serviced by DCC-DAS 100.

Each BTS in BTS farm 102 is connected to an MTDI. As shown, Digital fiber interfaced BTS's 104, 106, and 108 are connected to digital MTDI 142; RF BTS's 110 and 112 are connected to RF MTDI 144; and RF BTS 114 and Small Cell 118 are connected to RF MTDI 146. RF MTDIs 144 and 146 may passively combine the incoming RF signals from the various RF BTS's (110, 112, 114 and, 118) and adjust the level of the RF signals to the working level required by MTDI digital processor (320 in FIG. 3) which is part of each MTDI. Each MTDI can handle multiple BTS's. However if the number of BTS's in BTS farm 102 is greater than the maximum that can be handled by a single MTDI, then a number of additional MTDI's may be deployed as depicted in FIG. 1. Each BTS may also have MIMO links. The MIMO link connections and the way DCC-DAS 100 deals with MIMO links is shown separately in FIG. 15.

FIG. 1 depicts multiple RRUs 152, 156, 160, 162 which are connected to MSDH 130. Each RRU with its own antenna system covers a specific zone.

DCC-DAS 100 serves as IP backhaul for various devices such as Wi-Fi Access Points 128 and 129 or small cells 120 and 122. They can be directly connected to MSDH 130 like Wi-Fi access point (AP) 126 and Small cell 120 or through the RRUs like small cell 122 and Wi-Fi AP 129.

The IP backhaul data aforementioned is routed to MSDH 130 who splits the IP backhaul data from the digitized cellular data and sends the IP data to the Internet gateway 192 or VPN gateway 153 from which it is routed to the internet or to private lines 190 and 191, thus connecting those Wi-Fi APs or small cells with the external world or the operators network.

DAS controller 150 manages and controls the DCC-DAS 100. DAS controller 150 stores the various configurations of the DAS and various parameters such as routing configurations 182 (which is part of DAS controller 150) and Infrastructure constraints database 189 which is also part of DAS controller 150. DAS controller 150 interfaces with MSDH 130 through management gateway 199. The human machine interface 154 which enables the DAS operator to control and manage the system is also interfaced with the MSDH 130 through management gateway 199. DAS controller 150 is able to connect to an external operator NMS (Network Management System), send alarm data, or accept control data from the NMS. The management gateway 199 can directly interface with the operators' mobile telephone switching office (MTSO) 183, 184 for various control and management functions which will be explained later.

Figure 2A:
FIG. 2A depicts a representation of the filtering of cell resources.

In the downlink direction, each MTDI converts each incoming RF signal to an IF signal and then digitizes the IF signals and passes them through a digital filter bank. The MTDI may filter each incoming signal using a specific digital filter matched to the technology and the bandwidth of each BTS cell resource as shown in FIG. 2A. A cell resource is defined as a contiguous piece of spectrum that the operator of the DCC-DAS wishes to distribute, for example, consisting of one or more wireless signals of the same wireless cellular technology type. (However, this is just an example. A cell resource can also be any contiguous piece of spectrum in the frequency bands of the DCC-DAS that the operator wishes to digitize and distribute via the DCC-DAS RRUs. FIG. 2A shows the digital filters that are matched to each operator cell resource. As an example, we show cell resources in the US PCS frequency band. Trapezoids A1 and A2 are an analog representation of the digital filters allocated to Verizon™ cell resources in the PCS band. The white rectangular inside each such trapezoid A1 A2 represent the Verizon signals themselves. The amplitude of each such trapezoid represents the gain of each such digital filter. One can clearly see that the gains may be different for each cell resource. Likewise B1, B2, and B3 are an analog representation of the digital filters allocated to AT&T™ cell resources in the PCS band; and C1, C2, and C3 are an analog representation of the digital filters allocated to Sprint™ cell resources in the PCS band.

There are 4 major parameters that define the transfer function of each such cell resource digital filter.

- The contiguous bandwidth that needs to be covered by the digital filter. As one can clearly see it varies from operator to operator. It depends on the technology and the number of one or more signals residing in each such contiguous piece of spectrum.
- The slopes of each filter are usually dictated by the technology standards. Different technologies have different slopes or different masks as required by the various standards like 3GPP, FCC, etc.
- The gain of each filter is dictated by the output power level that is supposed to be transmitted by the DAS RRU. The higher the output power, the higher the gain. One can clearly see that each cell resource may have its own gain and hence its own transmitted output power.
- There are other parameters which are typical to each technology which are also taken into consideration like group delays, flatness, etc.

Figure 3:
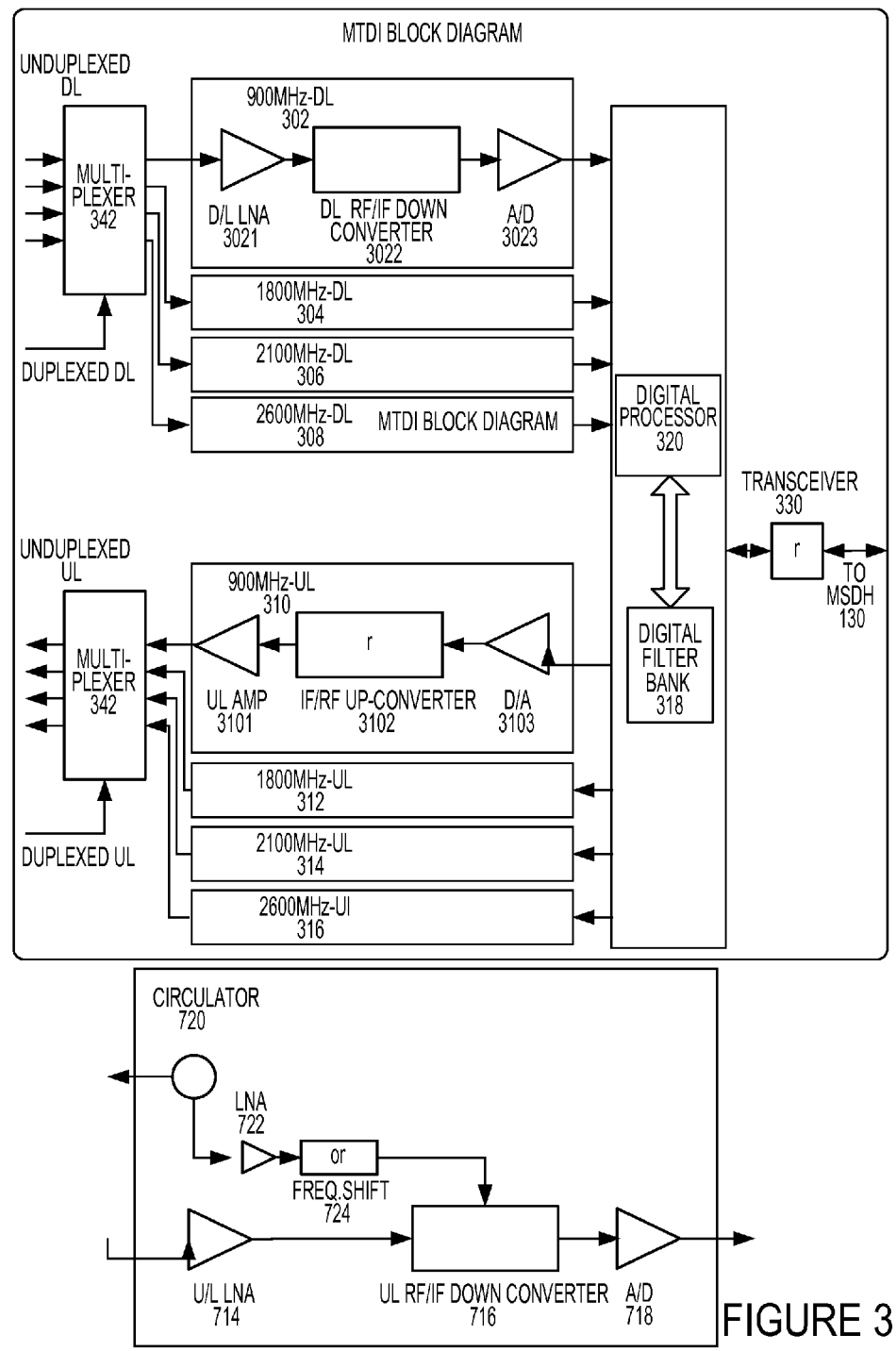
FIG. 3 depicts a block diagram of a MTDI.

The operator has to input to the digital processor the parameters like the technology (GSM, UMTS, etc.), the bandwidth, and the gain. The digital processor 320 (FIG. 3) will then produce the right filter and loaded into the digital filter bank 318 (FIG. 3). In this example the digital filter bank in the PCS will consist of digital filters B1, B2, C1, A1, B3, A2, C2, C3 as shown in FIG. 2A. Other unique digital filters can be programmed offline and loaded into the Digital processor 320.

One skilled in the art may understand that this is just an example and any other processor in the system or external to the system may produce the digital filter bank 318 which then will be loaded to the MTDI The MTDI then converts the digital filtered signals to a digital stream of data samples (e.g. I/Q data samples) which are routed to MSDH 130.

Figure 2B:
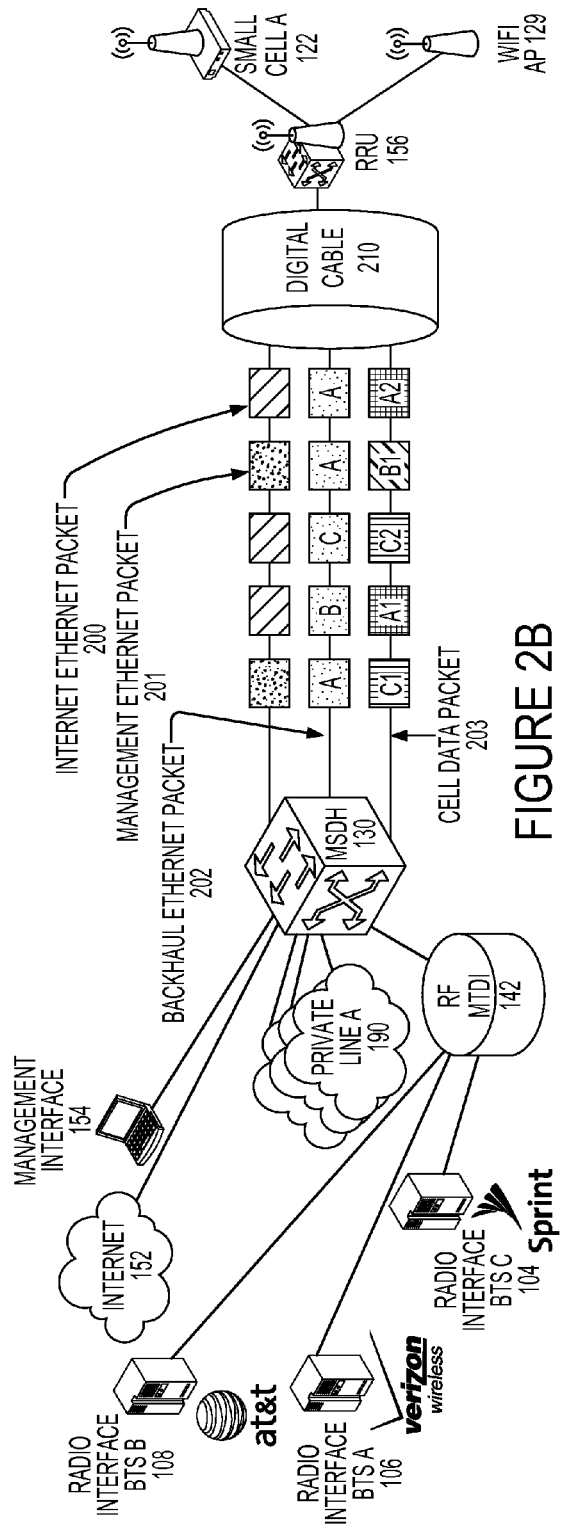
FIG. 2B depicts an illustration of how digitized cell resources are generated and sent across a CPRI link.

FIG. 2B shows a conceptual representation of the data flow in the digital link 210 between the MSDH 130 and the RRU 156. It clearly shows the cell resource data (203), C1, A1, C2, B1, A2 which are components of the digital links between the two modules. It also shows the Ethernet backhaul data packets 205 for the small Cell 122 and Wi-Fi AP 129 marked as A B C A etc., as well as Ethernet packets (201) for management and internet (200) purposes.

In the uplink direction, each MTDI performs the reverse operation. The MTDI receives a digital stream of data samples representing the cellular uplink channels coming from the Remote Radio Units (RRUs) through MSDH 130. It combines signals destined for the same BTS input and converts them to uplink signals that are sent to the various BTS's.

There are, for example, three functionally different MTDI modules: digital MTDIs that connect to BTS's through a digital interface such as digital fiber; RF MTDIs that interface using analogue RF signals with RF BTS's; and auxiliary BTS's that interface with auxiliary equipment.

MSDH 130 is the central hub of DCC-DAS 100. MSDH 130 receives the digital streams of cell resource data from the MTDI's and routes them to the various RRUs as directed by DAS controller 150. In the uplink direction, MSDH 130 performs the reverse operation. MSDH 130 receives data from the RRUs and directs it to the relevant MTDI which is then sent to the relevant BTS. Where the same cell resource is allocated to more than one RRU, the uplink signals from the RRUs are summed together in order to create a single combined uplink signal for that cell resource which is then sent to the MTDI.

As aforementioned, the MSDH 130 also handles Ethernet data which is used as the IP backhaul of the small cells (120, 122, and 124) and Wi-Fi APs (126, 128, and 129) and routes the data to Internet gateway 192 or VPN gateway 153.

Each RRU 156, 158, 160, and 162 is basically a multiple band, multiple technology digital repeater which receives a digital stream of cell resource data (digitized signals) from the MSDH 130, converts the data from IF signals to RF signals, and transmits the RF signals to one or more zones in the downlink direction. A zone is a geographical area covered by a single RRU output. Since an RRU may be connected to one or more antennas, a zone may be the area covered by one or more antennas which are all connected to the RRU. In the uplink direction, the RRU performs the reverse operation. The RRU receives RF signals, converts them to IF signals, digitizes the IF signal, passes the digitized IF signal through a digital filter bank, and sends the resulting signal to MSDH 130.

DCC-DAS controller 150, together with the database routing module 182 and control and management interface 154, store and control the various configurations of DCC-DAS 100.

FIG. 3 depicts an exemplary MTDI 300 designed to cover all the European spectrum consisting of four frequency bands, namely 900/1800/2100/2600 MHZ. As shown in FIG. 3, MTDI 300 comprises four downlink (DL) modules 302, 304, 306, and 308 (one module for each frequency band) and four uplink (UL) modules 310, 312, 314, and 316. Each DL module (consisting of LNA 3021, RF to IF Down conversion module 3022, and A/D converter 3023) converts the whole frequency band (e.g., the whole 900 MHz European band covering 35 MHz, the whole DCS band covering 75 MHz, or the whole US PCS band covering 65 MHz) into IF and then digitizes all the incoming signals in this band. As an example, downlink module 306 converts all the UMTS band to IF and digitizes it. The digitized data coming from the four DL modules enters a digital processor 320 comprising the digital filter bank 318 which allocates a digital filter to each cell resource. Thus, each cell resource has its own digital filter. Digital filter bank 318 may consist for example of 16 different filters. However, any number of different filters may be utilized. A digital filter is defined as a selective function that is intended to pass signals for one cell resource as previously defined. Each digital filter may have its own separate and distinct transfer function consisting of a specific filter mask as required for example by the specific technology standards, specific bandwidth, slopes, gain etc. The digital filters may all be implemented by a single digital filter bank 318 or may be distributed across a number of different processing modules. The digital filters in digital filter bank 318 may be operable in both the uplink and downlink directions.

The MTDI Digital processor 320 is programmed to convert the output of the digital filter bank 318 into a serial stream of digitized Cell Resource I/Q data (each such cell resource I/Q data is a digital baseband representation of the RF signal in the digital filter covering the frequency band of one cell resource. In other words, each such cell resource I/Q data is the digitized representation of the RF signal of a specific cell resource (which would typically be a baseband representation) which is obtained from the output of digital filter bank 318 and sent to MSDH 130 through transceiver 330. In the uplink the reverse operation is performed by the uplink modules 310, 312,314, 316, each one consisting of 3101,3102, 3103.

Figure 4:
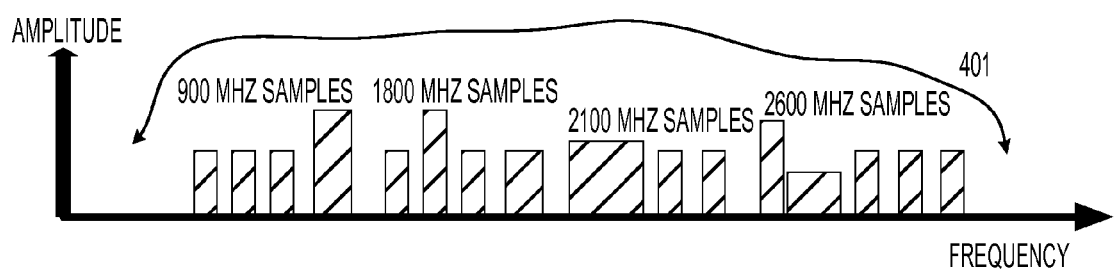
FIG. 4 depicts a sample analog representation of a serial data packet sent from the MTDI to the MSDH.

FIG. 4 depicts an analog representation 401 of the stream of serial Cell resource data which is the output of digital filter bank 318. The output of digital filter bank 318 constitutes all the cell resources of the BTS farm 102 in one sector. A sector cellular resource vector is defined as Si(C1 . . . Cn)

where Si is the sector no. i and C1 . . . Cn are the cellular resources (cell resources) 1 to n allocated to that specific sector. The analog representation in FIG. 4 demonstrates a case where n=16, and there are 4 bands and 4 cell resources per band and that each cell resource which is an analog representation of the output of a digital filter may have its own separate and distinct transfer function.

Zone Sector Allocation—

Figure 5A:
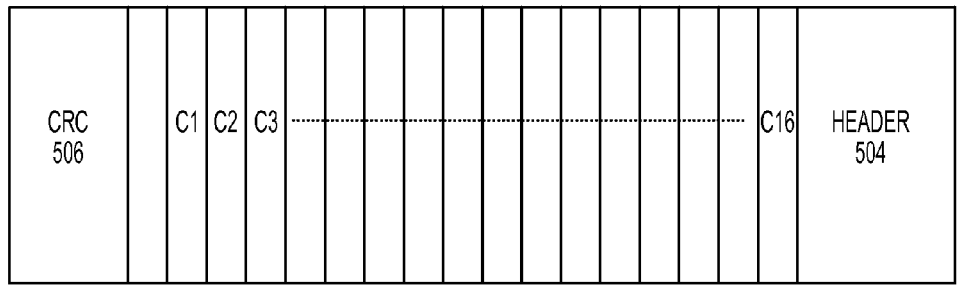
FIG. 5A depicts a stream of data representing the cell resources of a single sector.

FIG. 5A depicts a stream of data 500 comprising sixteen baseband cell resource data samples 502 C1 . . . C16 with header 504 and Cyclic Redundancy Check (CRC) 506. Header 504 and CRC 506 identify data stream 500 formed by one sampling of all the 16 filters in all the frequency bands and constitutes all the capacity resources of one sector assigned to one MTDI. In this case the whole vector S(C1 . . . C16) which comprises all the cell resources of one sector will be allocated as one unit to a number of zones. This is called Zone sector allocation.

Cell Resource Allocation—

Figure 5B:
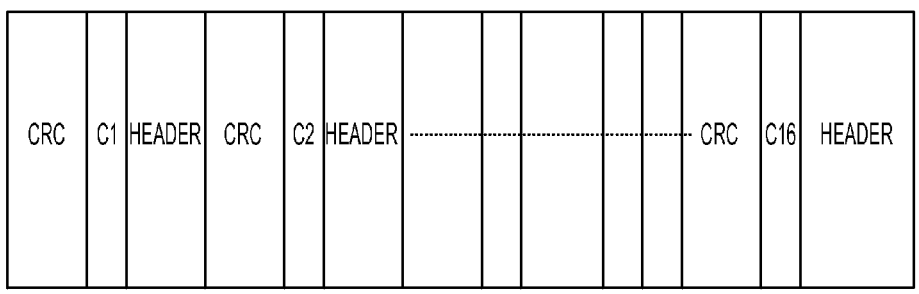
FIG. 5B depicts a stream of data in which each cell has its own header and CRC.

FIG. 5B depicts an alternative architecture for forming data packets in which data samples 502 are individually encapsulated by a header 504 and a CRC 506. This architecture enables also to independently identify each digitized Cell Resource I/Q data which is the output of each filter in filter bank 318. In this mode of operation, each cell resource is an independent unit and can be routed separately to different zones in the building. Instead of routing complete sectors, MSDH 130 now routes individual cell resources to the various zones. Thus, each cell resource data which is the output of each digital filter in digital filter bank 318 can now be routed to different zones. Additionally, the gain and power level of each cell resource can be individually adjusted. This mode may also be referred to as zone cell resource allocation, compared to zone sector allocation depicted in FIG. 5A

The aforementioned data format is only an example. Header 504 may be omitted if the identity of data samples 502 can be identified by some other means (e.g. implicitly due to prior negotiation over a management interface or due to some overall frame structure) and CRC 506 may be omitted in the case that error detection is performed by some other means or is not of interest.

It should be obvious to one skilled in the art that the sixteen filters in digital filter bank 318 or the four European frequency bands or the number of BTS's are just an example. All these parameters can vary based on the needs of the system designer. The size of digital filter bank 318 depends on the processing capacity of the MTDI and a more powerful processor will enable a bigger filter bank covering more filters and more cell resources.

The above described process is an efficient way to multiplex multiple outputs of many BTS's and various technologies into one serial stream of digital Cell resource I/Q data samples using one module and one processor with one digital filter bank where each data sample represents one cell resource and where the signal carried by that stream of data samples is processed according to its own specific transfer function. The group of data samples coming from one filter bank typically constitutes all the cell resources of one sector. The digital stream of Cell Resource I/Q data samples can use OBSAI/CPRI protocol or may use any other specific protocol chosen by the designer. In the example shown in FIG. 3, MTDI 300 consisting of one digital filter bank 318 can cover all the 4 European cellular bands (GSM 900, DCS 1800, UMTS 2100 and LTE2600) and can integrate 16 BTS's, each one having its own cell resource. Further, MTDI 300 can cover various cell resources in one band each one having different technology or same technology with different transfer function (frequency response).

An alternative implementation, which is functionally equivalent, is to implement filter bank 318 and the division of the signals into cell resource I/Q data samples on the MSDH 130. In this case, MTDI 300 would transmit a digitized representation of the whole of each frequency band to be divided into cell resource I/Q data samples internally within MSDH 130. MTDI 300 functionality described here would, in such a case, be distributed between MTDI 300 and MSDH 130.

The use of digital filter bank 318 allows the amount of data flowing through DCC-DAS 100 to be reduced, thus enabling more capacity in the cables. This is due to the fact that only the output of digital filter bank 318 (or just the cell resources data) is converted to serial data and not the whole spectral bandwidth of each specific band. The saving in the data quantity becomes significant, particularly when only one or two operators are involved and their assigned frequencies are just part of the whole spectral width of the frequency band. Formatting of the digital data for transmission through DCC-DAS 100 may also include an additional compression stage to even further reduce the data flowing in the CPRI links.

In the near future, the European and America cellular operators will be deploying new technologies in legacy bands. For example, the 900 MHZ GSM band in Europe is being reallocated to allow multiple technologies in this band so that now it becomes 900 MHZ covering GSM/LTE/WCDMA. The same is happening to other bands worldwide. The DCC-DAS architecture enables the user to easily reallocate or re-farm the spectrum in each band according to the various technologies deployed in this band. All he has to do is reconfigure the filter bank and select specific digital filter characteristics with specific transfer functions desired for each digital filter to accommodate to the new technologies cell resources. Such reconfiguration can be done via management interface 154 which may be accessed locally or from a remote location though the internet or off-air through RF modems Further, it is easy to add additional BTS's to BTS farm 102. All a user must do is connect the new BTS to the system and allocate specific filters in digital filter bank 318 to the new cell resources associated with the new BTS. If the BTS contains two or more technologies or non-contiguous cell resources, then two or more digital filters should be allocated in the digital filter bank, with each one of the digital filters allocated to one cell resource In the uplink direction, MTDI 300 performs the reverse operation. MTDI 300 receives the stream of data packets coming from the various RRUs through MSDH 130 and distributes them throughout BTS farm 102. The RRU's have their own digital filter bank accordingly.

Each MTDI 300 may serve one sector and the output of MTDI 300 will be routed by MSDH 130 to one or more zones. If additional zones need to be covered, or more capacity is required in a geographical region, then a new sector may be used to cover the additional zones in the building, or to provide more capacity to existing zones by dividing the area covered by DCC-DAS into new zones, each one covered by a dedicated sector. In this case, a second MTDI (MTDI 146 in FIG. 1)*may* be connected to an additional BTS 114, and small cell 118 for example. The output of the second MTDI 146 will be connected to MSDH 130. This second MTDI output will be another cell resource vector consisting of all the cell resources in the second sector. DCC-DAS 100 can now support up to n different sectors. Each sector will be routed to one or more zones in the area covered by DCC-DAS 100.

Figure 6:
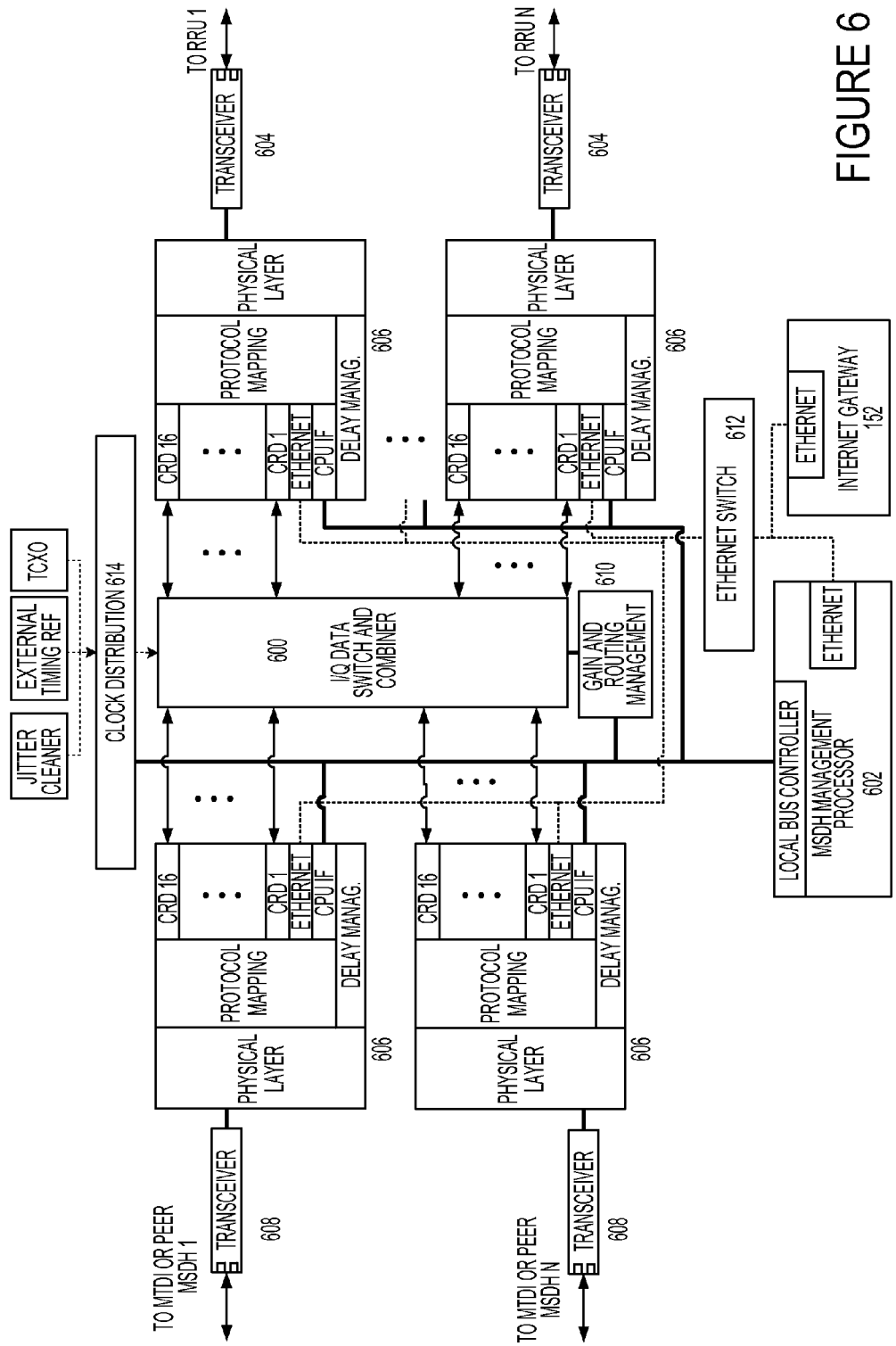
FIG. 6 depicts a block diagram of an MSDH.

FIG. 6, depicts a block diagram of MSDH 130. MSDH 130 is the central hub of the DCC-DAS 100. MSDH 130 connects to all the elements of DCC-DAS 100 like the RRU's (156, 158, 160, and 162); BTS farm 102 through MTDIs 142, 144, 146, and 148; Wi-Fi access points 126, 128, and 129; small cells 118, 120, 122, and 124; and slave DCC-DAS 140 for cascading purposes.

The main function of MSDH 130 is to distribute and route the downlink signals coming from the MTDI(s) to the various RRUs as directed by the DCC-DAS Controller 150 and perform the reverse operation to combine the uplink signals. All this is done based on the distribution matrix programmed into the I/Q data switch and combiner 600 FIG. 6 which is dynamically controlled by management processor 602.

MSDH 130 connects through various plug-in transceivers 604 to the RRUs which are located at various zones in the area covered by DCC-DAS 100, and through plug-in transceivers 608 to the MTDIs, and optionally slave MSDHs in case the DCC-DAS 100 is extended with multiple MSDHs. The exact number, configuration, and capacity depend on the building or campus size which is being served by DCC-DAS 100. Plug-in transceivers 608 and 604 transfer cell resource data samples from the MTDIs or slave MSDHs to and from the relevant RRUs based on the MSDH distribution matrix in I/Q data switch and combiner 600. The communication can be based on any suitable digital protocol, such as CPRI/OBSAI serial protocols or any other serial data protocol. MSDH 130 also embeds an Ethernet layer with the serial data stream of digitized cell resource data samples in order to transmit control data and serve as the IP backhaul of the offload devices such as small cells, Wi-Fi access points, or any other offload device. The various offload devices may be connected to the RRUs (e.g., Wi-Fi AP 129 is connected to RRU 156 by Ethernet connection in FIG. 1) and from there through the RRU CPRI link to the MSDH 130 or directly to the Ethernet switch 612 associated with the MSDH (e.g., Wi-Fi AP 128 in FIG. 1).

Data link blocks 606 in FIG. 6 are responsible for formatting the data transmitted over the digital links. In the example, interfaces are provided for data streams of 16 downlink cell resource data samples (CRD 1 . . . CRD 16) and the corresponding 16 uplink cell resource data samples. In addition, data link block 606 provides an interface for Ethernet data packets that serves as the IP backhaul for the offload devices, and a CPU interface (CPU IF) for control and management of the data link. These data elements are then formatted according to the protocol mapping layer for transmission/reception over the physical layer. The data link blocks 606 incorporate a delay management function which allows the round-trip delay across each interconnection to be measured. This can be used to equalize delays through the DCC-DAS 100.

MSDH 130 connects through one or more transceivers 608 in FIG. 6 to the various MTDIs and slave MSDHs. Typically, one transceiver 608 connects to each MTDI or slave MSDH; several transceivers may be used in parallel if the total data bandwidth exceeds the capacity of a single transceiver. The I/Q data switch and combiner 600 is enabled to combine (sum together) uplink cell resource data samples destined to a transceiver 608. This function is not necessary for transceiver 604 which connects to an RRU; omitting the function simplifies the design of I/Q data switch and combiner 600. The transceiver 604 therefore only requires a sub-set of the functionality of transceiver 608. A different implementation of the MSDH could allow combining of samples at all outputs, in which case any transceiver could function either as a transceiver 608 and 604 as required. Also, an operator may choose to use a transceiver that is capable as operating as a transceiver 608 as a transceiver 604 to increase the number of supported RRUs.

The Ethernet layer for each connection is combined by an Ethernet switch 612, which may be integrated within the MSDH 130 or may be a stand-alone device external to MSDH 130. From there, the Ethernet data is connected to auxiliary equipment such as internet gateway 192, DCC-DAS controller 150, management interface 154, etc. as shown in FIG. 1.

MSDH management processor 602 is responsible for maintaining the operating state of the MSDH 130 through the local bus controller. It is connected to the Ethernet switch 612 which enables remote access from the internet gateway 192. It may also communicate with peer devices (MTDIs, RRUs or MSDHs) as part of establishing and updating the connections through data link blocks 606. This communication may take place via Ethernet switch 612, or may involve some lower level communication directly via data link blocks 606.

Gain and routing management function 610 is responsible for updating the MSDH distribution matrix implemented by I/Q data switch and combiner 600 under control of the MSDH management processor 602.

Clock distribution function 614 provides the reference clock used through the MSDH 130. An MSDH can be the master of the system timing, or it can be a slave to a peer MSDH. In the event that it is master of the system timing, it generates its own internal reference clock using an in-built oscillator such as a TCXO, or it may receive an external reference clock from the external timing reference connection. In the event that the MSDH is slave to another MSDH it receives its timing reference via the corresponding transceiver 608. This timing reference is fed to the jitter cleaner to generate the internal timing reference used for all other transceivers 604 or 608. This clock distribution system ensures that transfer is synchronous across all data links, and avoids the need for resampling/retiming where data is interchanged between devices.

MSDH 130 connects through one or more transceivers 608 to auxiliary MTDI 148 (FIG. 1) which interfaces with auxiliary equipment such as repeaters or FM radio 132, jammer 138, public safety BTS 134, and location finding BTS 190.

MSDH 130 connects to slave MSDH 191—FIG. 1—through one of the transceivers 608, thus enabling a modular growth of the system. Several slave MSDH's which control additional multiple RRUs can be cascaded using this methodology, enabling the system to cover huge campuses and residential areas. Thus, this architecture enables modular growth by cascading MSDH elements, each one of them serving multiple remote RRUs.

Returning now to FIG. 6, one can see how Ethernet data is switched from transceiver 604, through Ethernet switch 612 to internet gateway 192. The backhaul IP data is in this way transmitted directly to the internet instead of to the MTDI like in the case of the cell resource data samples.

Figure 7:
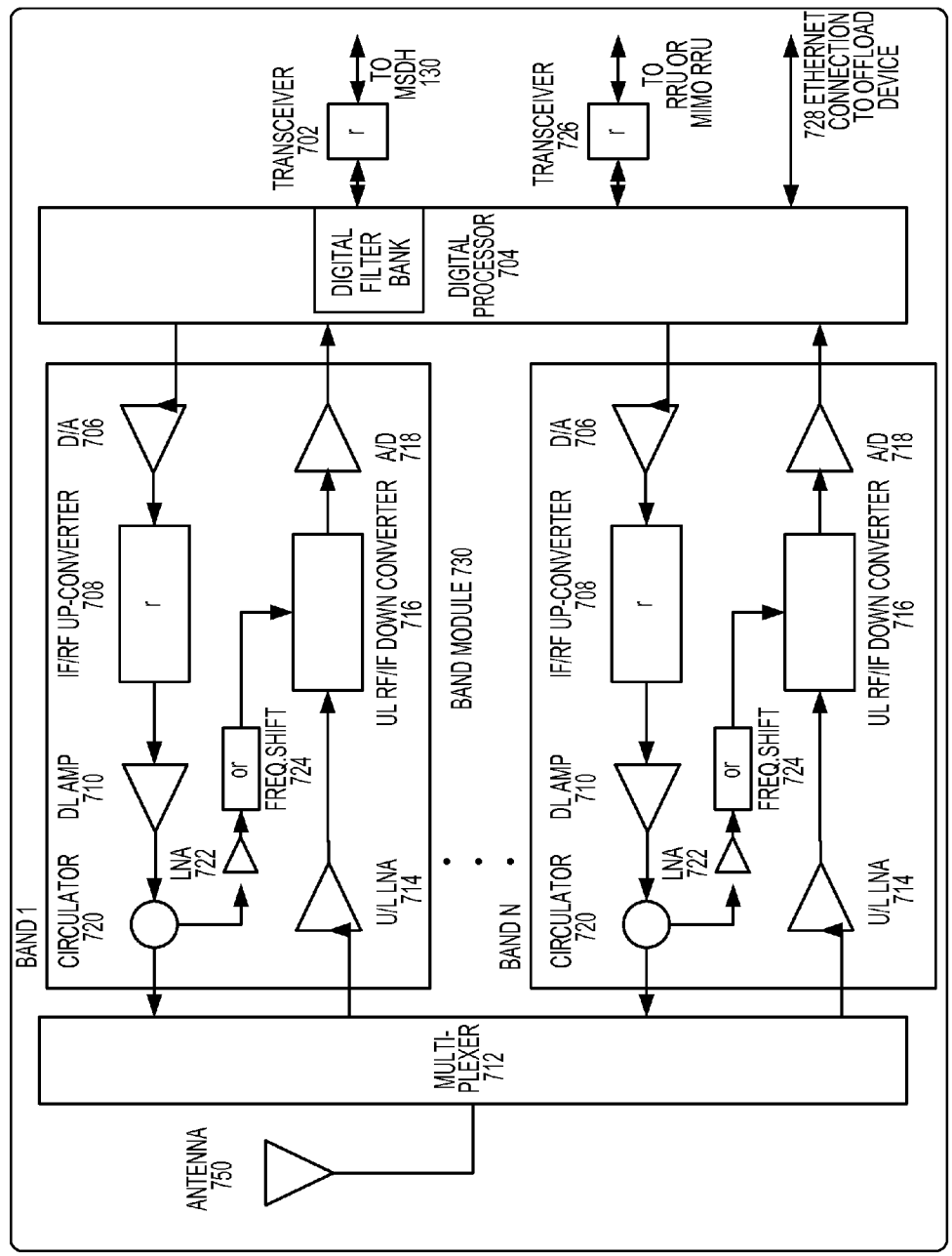
FIG. 7 depicts a block diagram of an RRU.

Remote Radio Units 152, 156, 158, 159, 160, and 162 are the transmitting and receiving front ends of the system. Each RRU is a multiband digital repeater which can be designed to cover all wireless or cellular technologies of interest (US or European or any other). FIG. 7 depicts a block diagram of an exemplary RRU 700. In the downlink path, transceiver 702 receives the serial stream of cell resource data samples from MSDH 130 (CRD1 . . . CRD16 in 606 FIG. 6). RRU 700 then processes and passes the signal through the digital processor 704. Digital processor 704 has a similar, though not necessarily identical, digital filter bank to MTDI 300, but in the uplink path. This digital filter bank in the RRU contains one or more relevant digital filters corresponding to the cell resources which are allocated to the RRU 700. Digital processor 704 reconstructs the composite signal for each output frequency band from the cell resource data samples, and outputs each signal to the corresponding band module 730. D/A converter 706 in each band module 730 converts the outputs of the filter bank relevant to this band to an analog IF signal which is then up-converted to RF frequency by converter 708. Downlink amplifier 710 amplifies the signal and sends it to multiplexer 712. Multiplexer 712 combines all the N relevant bands into the required number of RF output signals.

The output of multiplexer 712 is connected to one or more outputs covering one zone. The output may be split into one or more antennas, each one covering a sub-zone which may consist of one room or one floor or group of floors in the building (or relevant users areas in an outdoor environment). In the uplink path multiplexer 712 receives all the mobile cell-phone signals and splits them to all the relevant N bands. For each band, a low noise amplified (LNA) 714 provides low noise amplification. The amplified signal is then down converted to IF by down converter 716 and then converted from analog to digital by A/D converter 718. Digital processor 704 combines all the signals from all the bands and passes the uplink digital signals through a digital filter bank. The signal is then converted to serial uplink cell resource data samples and sent through the transceiver 702 to MSDH 130. As in the case of the MTDI, it is possible to partition the system such that the filter bank is implemented on MSDH 130 while maintaining the same functionality.

RRU 700 additionally contains a sniffer receiver circuit in each band module 130 which comprises circulator 720, LNA 722, and frequency shift module 724. The purpose of the sniffer receiver is to measure all the downlink signals coming from the adjacent RRUs and the macro network in order to measure the isolation between the various RRUs and the level of penetration of the macro network into the building, or to be more precise into the zone covered by the one or more antennas connected to each RRU 700. The process of measuring the isolation between the various RRUs is done by shutting down or disconnecting the output of DL amplifier 710 only in the measuring RRU from the multiplexer 712 and disconnecting the output of LNA 714 in the UL path from downconverter 716, and connecting UL RF/IF down converter 716 to Freq. shift 724 of the measuring RRU. The receiving path of the measuring RRU consists now of multiplexer 712, circulator 720, LNA 722, Frequency shifter 724 and downconverter 716. This measuring RRU is practically acting now as a sniffer receiver. The rest of the relevant RRUs in the DAS are transmitting test signals simultaneously (or in succession) in all the cell resources frequency allocations, or alternatively are transmitting normal DL traffic and logging the power level etc. of the transmitted signals. These test signals are then received in the downlink path of the specific measuring RRU 700 who is in a sniffing receiving mode through the aforesaid sniffer receiver circuit which comprises circulator 720, LNA 722, and frequency shift module 724 and RF/IF down converter. The downlink test signals, which are received by multiplexer 712 are diverted by circulator 720 to LNA 722 and amplified by LNA 722, are now converted by frequency shift module 724 to the relevant up link frequencies and are now processed by the uplink path as if they were uplink signals. One should remember that these signals are an image of the original downlink signals penetrating this RRU which are shifted by a certain constant to the uplink channels. For example, the downlink signals in the US cellular band are shifted by 45 MHZ from downlink to uplink signals. The shifted signal is then processed by the uplink channels. The level of the test signal is measured and sent to MSDH 130 for processing. Based on the received signal levels in each cell resource filter in the filter bank located in digital processor 704 and the level of the test signals (either generated test signals or logged downlink traffic), MSDH 130 can calculate the isolation between each RRU and the specific measuring RRU and also the level of penetration of the macro network to that specific measuring RRU zone.

Different implementations of the sniffer receiver circuit can be considered, which achieve the same outcome while providing various trade-offs. For example, the LNA 722 may be omitted at the expense of reduced sensitivity. The frequency shift function may be omitted in case the downlink frequency band lies within the tunable range of uplink RF/IF down converter 716.

As aforesaid, the sniffer receiver circuit may be used to measure the penetration of the macro network into the building. In this process, all the DCC-DAS's RRUs downlink and uplink channels are muted or disconnected as aforementioned and all the RRU's are now receiving signals through the sniffers receiver which consist of elements 712, 720, 722, 724, 716, 718, and 704. Thus, the RRU sniffer receiver may receive now only the external macro network signals which may penetrate the building. By measuring the signal strength in each filter of the uplink digital filter bank in digital processor 704, the system may measure the macro network signals in each of the cell resources frequencies ($c_1 \ldots c_n$). A vector $MS_j$ ($C_1 \ldots C_n$) may now be generated. DCC-DAS controller 150 may now know how much interference the macro network causes to DCC-DAS 100 and also one skilled in the art knows that this is related to the level of interference DCC-DAS 100 may be causing to the macro-network by signals leaking from the building. All this information is critical to the performance of DCC-DAS 100 and the Macro-network as well. DCC-DAS 100 is thus capable of calculating this information without the use of external test equipment and costly manpower.

RRU 700 may comprise one or more transceiver ports 726 which connect RRU 700 to a slave RRU. The slave RRU can be used for extending the coverage of RRU 700 to additional zones (i.e. floors for example); to add more bands or technologies to the master RRU; or to provide MIMO capabilities to the bands in RRU 700. Typical interfaces, such as OBSAI/CPRI over a fiber-optic connection, may be used to connect to the slave RRU. This configuration allows for connecting multiple RRUs in cascade all being connected through one transceiver 702 and one cable to MSDH 130.

Additional Ethernet port 728 may also connect to an off-load device such as Wi-Fi Access Point 129 or Small Cell 124 (see FIG. 1). In this case, Ethernet port 728 serves as the IP Backhaul link for the offload devices. The backhaul data is connected through Ethernet port 728 to digital processor 704 and from there through transceiver 702 to MSDH 130. The MSDH 130 splits the cell resource data from the IP backhaul data or other Ethernet-carried data as aforementioned. This method enables a quick and easy integration of DCC-DAS 100 with any device that requires IP backhaul infrastructure.

The communication from MSDH 130 to other DCC-DAS 100 modules in most cases may be based on fiber optic cables (Single Mode and/or Multi Mode Fiber) and associated transceivers in order to enable high capacity traffic. However, DCC-DAS 100 may use any cable that exists in the building such as CAT5 cables, copper cables, Ethernet cables, TV cables, coaxial cables, etc. In order achieve this flexibility, the transceivers may not be an integral part of the MSDH, RRU, or even the MTDI. They can rather be plug-in modules that can be selected based on the specific installation needs.

All a user has to do is choose the right plug-in transceiver that fits the cable and the capacity enabled by that specific cable which was selected. The user must then connect it to the cable and plug it into MSDH 130. If the installation is changed and new cables are installed then the plug in transceivers can be replaced accordingly.

DCC-DAS management processor 602 (FIG. 6) is programmed to read (from the system configuration or the transceivers themselves) the maximum capacity that each transceiver/cable can handle and will not allocate any capacity which is higher than the maximum supported by that specific transceiver and the associated cable.

There are three modes of capacity allocation available for DCC-DAS 100:

a. Automatic dynamic capacity allocation of one or more cell resources b. Manual static capacity allocation of one or more cell resources c. Preset, time-dependent, capacity allocation of one or more cell resources Further, automatic dynamic capacity allocation may be divided to three modes of operation:

a. Cell resource dynamic allocation—An architecture in which the building or campus is served by one centralized wireless BTS farm consisting of a single sector. This is a typical situation of a small building (or outdoor area) or a building (or an outdoor area) with small capacity requirements in which a single sector resources may suffice.

b. Cell resource dynamic allocation with offload devices—Same as Cell resource dynamic allocation, except that there are offloading devices distributed in various zones inside the building (not co-located with the central BTS farm) which can offload capacity in the area they are installed.

c. Zone-sector dynamic allocation—Used when there are two or more sectors serving the building or the outdoor area DCC-DAS. In this case the, dynamic capacity allocation comprises two steps:
  i. Zone-sector allocation—Various zones are optimally allocated to the two or more sectors involved, so as to optimally distribute the various sector resources amongst the various zones.
  ii. Cell resource dynamic allocation inside each sector—Once zones are allocated to each sector, a cell resource dynamic allocation is performed in order to optimally distribute the cell resources of that specific sector to the zones allocated to this sector.

Figure 8:
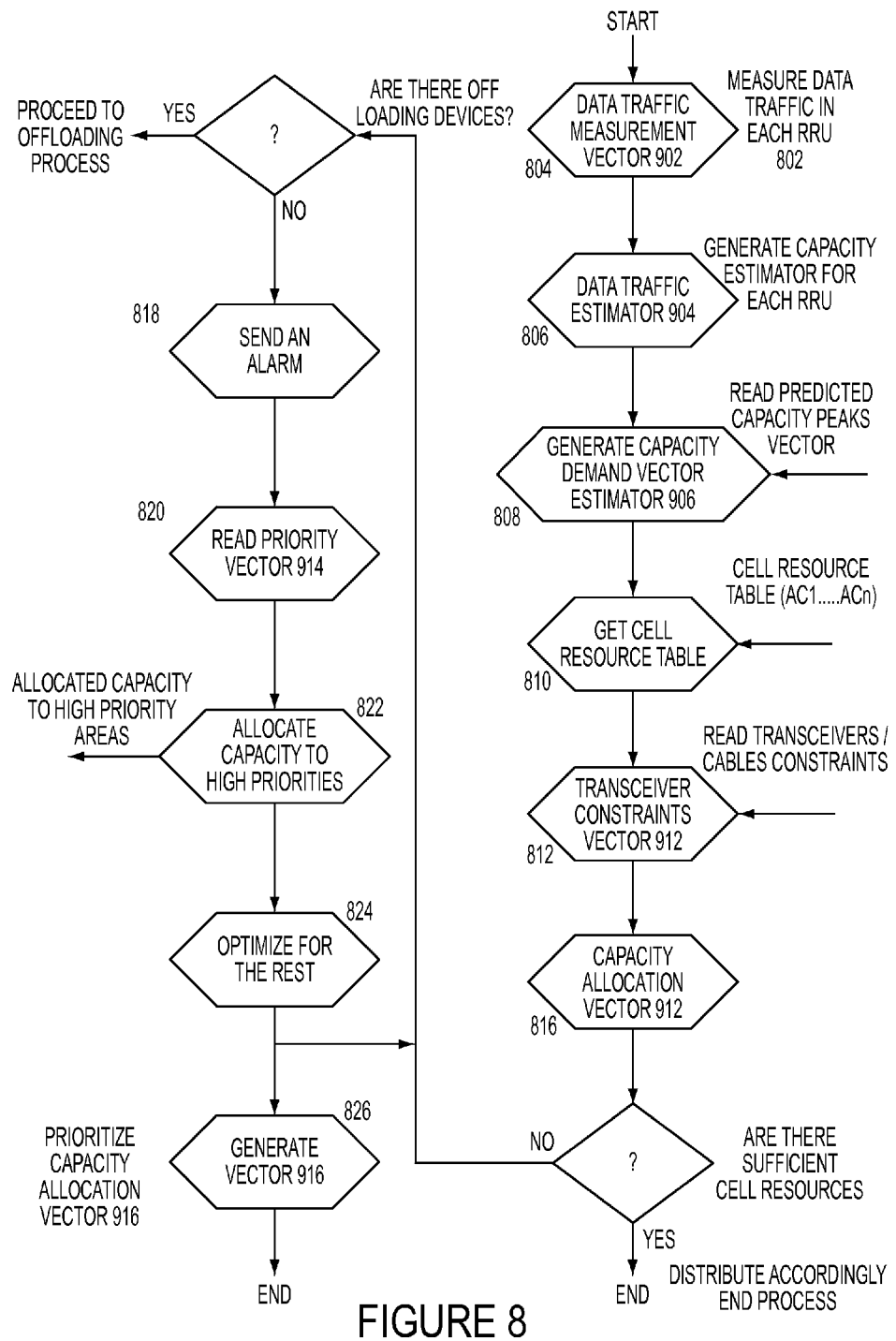
FIG. 8 depicts a flowchart for the dynamic capacity allocation process for one sector

FIG. 8 depicts a flow chart showing the steps used in capacity allocation process where there is only one sector served from one BTS farm. Although we describe the MSDH 130 as doing all this processing, one skilled in the art will know that these steps can be performed by any device in DCC-DAS 100 having enough processing and storage capabilities. FIG. 9 depicts the various capacity related vector measurements generated in this process.

The cell Resource dynamic allocation is performed as follows. First, the data traffic from each RRU is measured in step 802 both in the down link and uplink channels. This can be done by measuring the energy in each filter of the filter bank which is part of the digital processor 704 in FIG. 7 and using that measurement as an estimation of the traffic in each filter of the filter bank in the relevant RRU. However, this method is not highly accurate, particularly for 3G/4G signals. A more accurate method entails using the 3G/4G modulation and coding to actually detect the 3G/4G signals at each RRU and directly measure the traffic in each filter of the filter bank. MSDH 130 (or any other processing element in the system like the digital processor 704 in each RRU) may read (from the DCC-DAS controller 150) the specific modulation, coding and timing parameters of the specific BTS's in the BTS farm and thus make the detection process more efficient/feasible.

The output of the data traffic measurement step is recorded in a data traffic measurement vector in step 804. An exemplary data traffic measurement vector 900 is depicted in FIG. 9. A typical data traffic vector in RRUj is TM j (c1 ... cn) shown in FIG. 9 (902). This vector shows the data traffic in RRU number j in the various cell resources filters (c1 ... cn), each one of them corresponding to cell resource (CR1 ... CR n) accordingly. Each RRUs data traffic vector 902 is transmitted to MSDH 130.

If the noise in each digital filter in RRU 700 or in MSDH 130 is above a certain threshold, it may indicate a problem in the uplink. MSDH 130 may respond by a) sending an alarm, b) reducing the gain of that specific cell resource corresponding to said digital filter, or c) rerouting that specific cell resource.

Returning to the cell resource dynamic allocation process, MSDH 130 may generate data traffic estimator vectors 904 in step 806 for each RRU. Data traffic estimator vectors 904 represent the estimated imminent data traffic expected in each zone associated with each RRU. Data traffic estimator vectors 904 are a product of a process that estimates imminent or upcoming capacity demand based on historical and recent measurements of used capacity. Estimators are well known to one skilled in the art and are usually based on few historical measurements which are logged, analyzed and from which the estimator is calculated (one example are the well known Kalman filters which are used for various applications).

In addition to generating the data traffic estimator vectors 904, the allocation algorithm may receive predicted capacity peak vectors 906 in step 808. Predicted capacity peak vectors 906 relate to pre-planned expected peaks of capacity demand in certain times of day in certain RRUs. They also provide additional information such as upcoming events which require extra capacity or minimal capacity, etc., and which the algorithm should take into consideration, or special times of day in which capacity demand is expected to grow, or any other data received by the operator which may affect the demand in the near future. As shown in FIG. 9, the vector EPj (906) shows one RRU-j in which extra capacity demand is expected. The vector contains also the expected time of day for this event. This extra demand is represented by $EPj(0 \ldots ck,0,0)$ which means that only RRU j which relates to zone j is expecting extra demand and the demand is only for cell resource Ck which may be for example a 4G cell resource. The allocation algorithm then combines the predicted capacity peak vector (906) with the data traffic estimator vector (904) and generates total capacity demand vectors 908 in FIG. 9 in step 810 in FIG. 8.

Next, the allocation algorithm reads from the MSDH management processor 602 (which reads this information from DAS controller 150) all the cell resources available in the BTS farm in one sector and generates an available cell resource vector (Ac1 ... Acn) for all the frequency bands in step 810 (Ac stands for Available cell resource). Although this process provides a general description to all the cell resources available in the BTS farm, one skilled in the art will realize that this process can be performed on any one or more cell resources in the BTS farm whether they belong to a Radio Interface BTS 114 for example or small cell 118 or any other cell resource. More than that not all the RRU's may participate in the process and the process may be performed for only a partial group consisting of one more of those RRUs. For example the process may be performed on one or few of the BTS cell resources and one or few of the RRU's while the rest of the cell resources are manually allocated to the rest of the RRU's. One skilled in the art will realize also that the cell resource vector may be generated for one operator or more than one operator. The optimization process can be performed for each operator separately or for all operators together if they have an agreement to share the resources.

The allocation algorithm may also read from each of the transceivers the maximum capacity allowed in each transceiver j in step 812. The allocation algorithm then generates a transceiver/cable constraint vector 910 for which represents all the transceivers & cables constraints in the DAS. This vector 910 consists of one parameter per transceiver and this parameter is maxc j which means max capacity (e.g. in GBit/sec) allowed in transceiver j.

Based on vectors 906, 908, and 910, the allocation algorithm now allocates the available cell resources to the various zones and generates a capacity allocation vector 912 and allocates the cell resources to the various RRUs accordingly in step 816.

Capacity resources will be allocated based on the aforementioned capacity allocation vector 912. When one or more of the cell resources do not suffice to one or more zones, the allocation algorithm may send an alarm message to the NMS (Network Management System) in step 818. It may also reperform the optimization process, based on the limited cell resources which are currently available. In order to best serve the users, the process may read the pre-programmed priority vector 914 (FIG. 9) which defines which zones should get higher priority (e.g., executive floor, convention center, VIP lounge) and what cell resources should be prioritized to these zones in step 820. A pre-programmed priority vector identifies the cell resources that will be routed to the high priority zones. Once cell resources are allocated to the prioritized zones in step 822, the allocation algorithm is repeated for the rest of the zones and rest of cell resources in step 824. A new prioritized capacity allocation vector 916 is generated in step 826 and cell resources are allocated accordingly.

Although this patent application describes the whole process in its entirety, one skilled in the art should realize that not all the steps must be performed. One can skip for example the estimation part of the model and base the capacity allocation process purely on measurements and not on estimators or likewise skip any other step in FIG. 8, in which the capacity allocation process will be less than optimal.

In some instances, the operator may decide not to let DCC-DAS 100 perform automatic allocation of capacity when there is a shortage of cell resources. In this case, the system will send an alarm and notify the operator accordingly and the capacity cell resources will be allocated manually.

As aforementioned the proposed process deals with all the cell resources in an equal way. However the operator may decide to distribute several cell resources evenly across the entire building just to provide coverage and low level basic capacity and allocate specific cell resources (like LTE, or any other broadband resource) to the optimization process. In this case the cell resource table will consist of only those cell resources and RRUs that participate in the optimization process. For example 2G/3G cell resources may be broadcasted to all the zones in the entire sector whereas only one or more of the 4G resources will participate in the optimization process and be routed only to those zones in the building which experience peaks of capacity demand.

There are certain cases in which the operator will install dedicated capacity resources such as Small Cells or Wi-Fi access points in several remote areas in the building or in the campus. These will typically be areas in which there are constant peaks of capacity demand such as executive rooms, convention areas, food courts, etc. These localized capacity resources provide a capacity offload and thus alleviate the capacity demand from BTS farm 102. The main difference between such a Small Cell or Wi-Fi access point and the main BTS farm 102 is that the resources of these remote devices can only be used in the local area in which they are installed. Their cell resources cannot be routed through the building like the cell resources of BTS farm 102.

Nevertheless, the optimization algorithm described in FIG. 8 should take these offload devices into consideration when performing the allocation process. DCC-DAS controller 150 should also ascertain that there will be no interference between the resources of BTS farm 102 and the various offload devices. Thus, BTS farm 102 and the offload devices in DCC-DAS 100 are treated as one integrated system.

Figure 10:
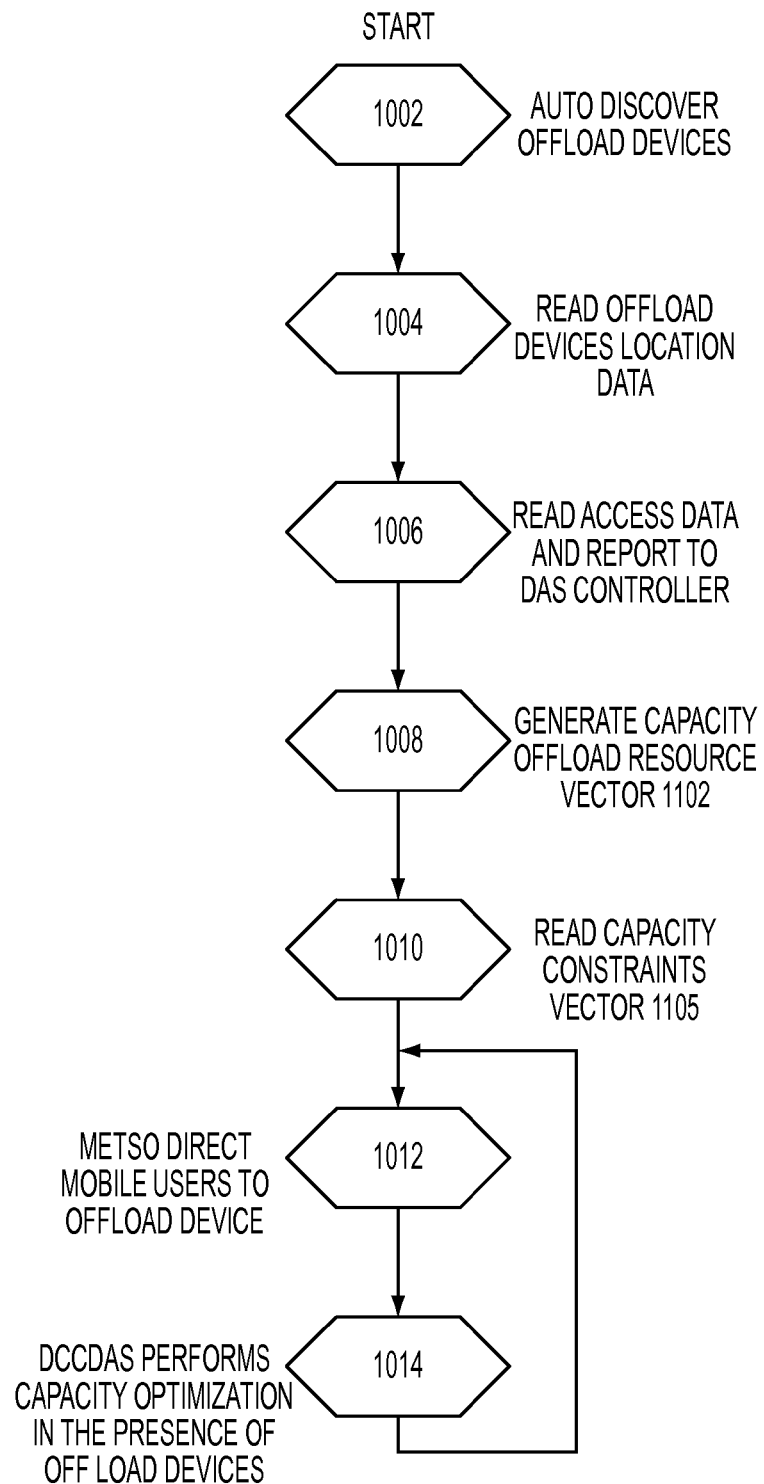
FIG. 10 depicts a flowchart for the dynamic capacity allocation process in the presence of offload devices.

FIG. 10 depicts a flowchart showing the optimization process which takes into account the capacity of the various offload devices and FIG. 11 depicts the vectors resulting from the optimization process of FIG. 10. As depicted in FIG. 10, the MSDH 130 first auto-discovers all the remotely located offload devices in step 1002. The system reads in step 804 the zones to which these offload devices are related whether they are directly connected to MSDH 130 such as small cell 120 or indirectly through an RRU such as small cell 124. Next, the MSDH 130 reads the parameters and access data of the offload devices in step 1006 and reports to DAS controller 150. This location information is important for capacity routing purposes and for location based services.

The location parameters and access data are reported to DCC-DAS controller 150 in step 1006. Optionally, the same information is reported to the operators Network Management system or MTSO (FIG. 1) because it is important to the operator to avoid interference. For example, the information may be used by the operator to program BTS farm 102 to perform smooth handovers to small cell devices located in the various zones and vice versa and also to avoid interference with the offload devices. Alternatively, to avoid interference, BTS farm 102 continues to transmit all the cell resources in that sector. However, the allocation algorithm will identify the specific cell resource which may interfere with the offload devices and ensure that these cell resources will not be routed into zones in which the specific small cells was installed.

Next, MSDH 130 uses the auto-discover information, the zone location parameters, and access data to generate a capacity offload resource vector 1102 in step 1008. Capacity offload resource vector 1102 describes the offloading capacity of the various offload devices in DCC-DAS 100. For example, capacity offload resource vector 1102 in FIG. 11 depicts an example in which there is one capacity offload device in the zone covered by RRUj:

OL j (0 . . . Ok . . . 00 . . . Wi)

Vector OL j means that in RRU number J there is an offload device that provides offload capacity in cell resource k. (Ok) and Wi-Fi resource Wi. As shown above, the offload resources may be a cellular resource like 3G/4G small cell, a Wi-Fi access point, or any other broadband resource. Vector OL j is of course just an example.

Next, the allocation algorithm reads the capacity constraints vector 1105 (FIG. 11):

CC j (CRD j, IPD j)

which deals with the cabling capacity constraints to zone j In the presence of offload devices, the MSDH and RRU transceivers may now carry not only the stream of cell resource data samples but also the IP backhaul data of the remote offload devices where they are connected via an RRU. Hence, the capacity constraints vector may take into consideration the maximum capacity allowed in the Ethernet backhaul application as well. Hence, capacity constraints vector 1105 will consist of two parameters:

CRD j—maximum Cell Resource Data capacity in transceiver j

IPD j—maximum IP Data capacity allowed for Ethernet in transceiver j.

MSDH 130 may read this data, save it, or send it to DCC-DAS controller 150.

The algorithm described in FIG. 10 also provides for real time capacity allocation in presence of the offload devices. It is assumed that DCC-DAS controller 150 performed dynamic capacity allocation before an offload device or a group of offload devices were installed. Returning now to FIG. 10, the capacity allocation process should now be repeated in order to take into consideration the offload devices that have been introduced. First, the MTSOs 184, 183, FIG. 1, having received all the parameters and access details of each of the offload devices from DAS controller 150, start directing all the mobiles units in the relevant zones in the building to the relevant offload devices in step 1012 so that whenever there is a mobile unit in a zone covered by a specific offload device, it senses this device and performs handover to that offload device. This process is controlled by the carrier through BTS farm 102.

Next, DCC-DAS controller 150 through the MSDH management processor 602 continuously performs a dynamic capacity allocation process to optimize the BTS farm cell resources for the remaining demand of capacity in step 1014 because the remaining demand still needs to be handled after the diversion of some cell resources to the various offload devices. The capacity allocation algorithm will take these local offload resources of capacity represented by vector (1012) into consideration and generate a new capacity allocation vector 1104 (FIG. 11) which now shows the cell resources allocated under these new offload conditions. The allocation algorithm in MSDH 130 management processor 602 will allocate the cell resources of BTS farm 102 according to capacity allocation vector 1104 in FIG. 11.

The process of taking offload devices into consideration may start automatically once DCC-DAS 100 is activated or may start only in a situation in which the operator decides to enable this operating mode.

In big buildings, campuses, or large and complex outdoor coverage areas, when more than one sector is required to cover the building or campus, a number of sector resources may be utilized. The building/campus or outdoor areas will then be divided into several areas, each consisting of one or more zones and each may be covered by a specific allocated sector. Since there should be a minimum isolation between each sector area, DCC-DAS 100 may measure the isolation between the various RRUs' antennas and automatically generate an isolation mapping of the building (or outdoor DCC-DAS) showing the cross isolation between the various zones, each of which is covered by one RRU. In the next step, when the sectors are allocated the isolation between the zones is taken into consideration in order to minimize interferences and thus enable optimal resource allocation. The following steps are performed.

A sniffer receiver is installed in each RRU band module 730 so that the RRU can receive Downlink signals. (see FIGS. 7, 712, 720, 722, 724, and 716)

All the RRUs may be muted and the BTS signals may be routed only to RRU no. i. The sniffer receivers in the rest of the RRU's may receive those RRU no i signals and send them to the RRU's processors. The RRU no i processor may measure the output power level of signals transmitted in each of its cell resource filters and report to the MSDH. The difference between the level of RRU no i cell resource signals transmitted and those received in the corresponding cell resource filters in RRUj is the cross isolation between zone i and zone j antenna system, accordingly—. FIG. 13 table 1300 shows vectors $Isij(C1 \ldots cn)$ which is the isolation between zone i and zone j or the antenna of RRU j and antenna of RRU i(One skilled in the art should realize that since each RRU is connected to a group of one or more antenna the $Isij$ ($C1 \ldots Cn$) represent the worst or minimal isolation condition between the two groups of antenna). The process then proceeds to RRU2 and RRU3 and so on accordingly until all RRUs are visited. An isolation matrix may be performed for all the RRUs. For example, vector $ISij$ (c1 $\ldots$ cn) represents the isolation between RRUi antenna and RRUj antenna (or zone i and zone j antenna) in each of the DDC-DAS cell resources frequencies. An operator may opt not to mute the RRU signals when performing the isolation measurement. In which case he may transmit test signals near the relevant operational frequencies of the DCC-DAS and estimate the isolation based on these test signals, or log the levels of the normal downlink traffic and estimate according to the levels at corresponding points in time. The estimation in these cases may be somewhat less accurate, but the DCC-DAS signals are not muted during the measurement cycle Initial zone-sector allocation may now be performed in the DAS coverage area It will be based on the following steps:

a. The coverage area may now be divided into two or more sector areas each covering an equal number of zones. So now each BTS farm sector cell resources may be allocated to the same number of zones and hence cover the same number of zones.

b. Every one skilled in the art knows that certain isolation should be maintained between two sectors. The system may allocate the various zones to the relevant sectors in such a way as to minimize interferences between sectors. This is based on isolation matrix shown in FIG. 13. This means that two or more adjacent zones having poor cross-isolation will not be allocated to different sectors.

c. Once this is done the RRU's in each sector may start measuring data traffic and the DAS Controller may perform dynamic capacity allocation for each sector, as illustrated in FIGS. 8-9,10,11.

d. If the capacity demand is bigger than capacity supply in a certain sector A and capacity demand is smaller than capacity supply in another sector B, certain zones may be withdrawn from sector A and added to sector B where there are more capacity resources available. This process of adding zones to sectors with available cell resources and withdrawing zones from sectors, whose cell resources are overloaded, continues until the capacity demand versus the capacity supply is balanced across the whole coverage area.

e. When doing this process the DAS controller through the MSDH management processor 602 will use the matrix shown in FIG. 13 in order to avoid interference.

f. By the end of this process there is an optimal zones-sectors allocation in the building (or in the outdoor DAS).

g. The system may then restart the cell resources optimization inside each sector area as described in cell resource dynamic allocation (single zone) paragraph and illustrated in FIGS. 8-11.

h. The whole process of optimal zone-sector allocation followed by a cell resource dynamic allocation in each sector may repeat itself periodically based on the operator needs.

The process of capacity allocation does not have to be fully automatic or dynamic; it can also be done manually. However, even in the manual mode, DCC-DAS 100 can provide data that can significantly assist the operator in its design. There are two modes of manual design:

a. Static capacity allocation design.

b. Preset, time-dependent, configuration design.

Figure 12:
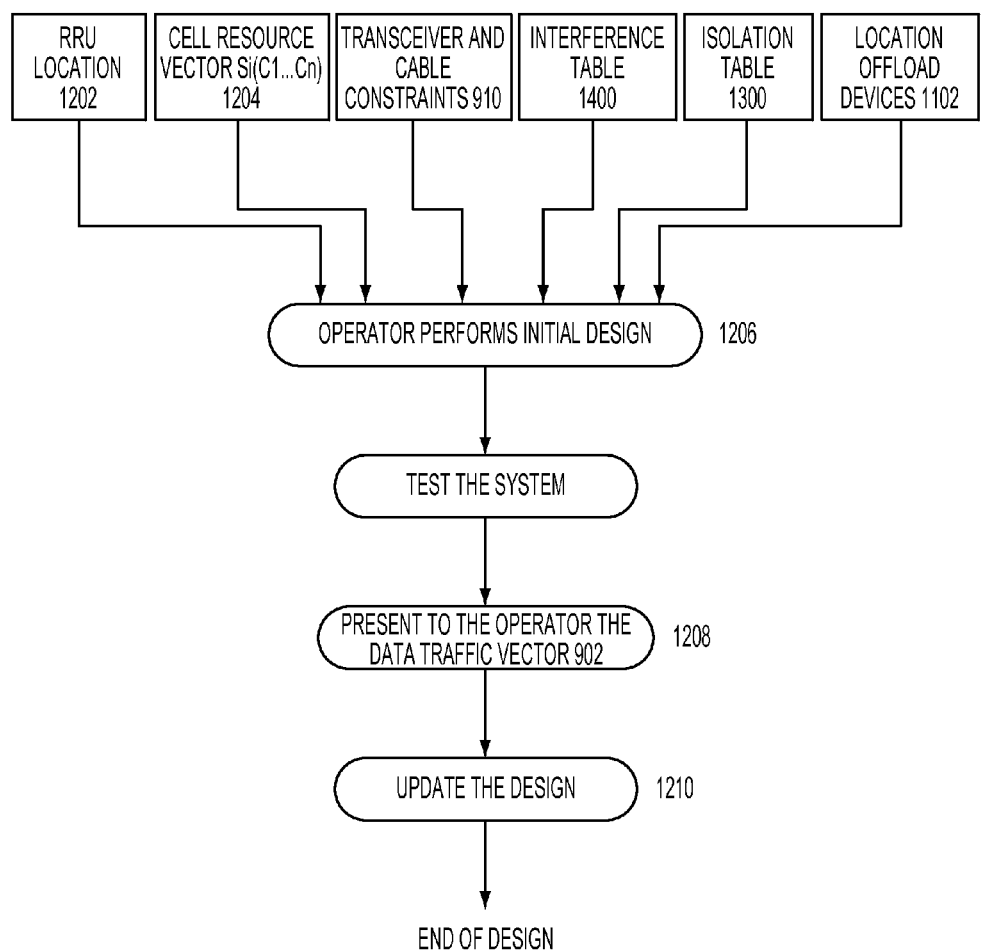
FIG. 12 depicts a flowchart for a preset time dependent configuration.

The two modes are depicted in FIG. 12. In order to aid an operator in performing static capacity allocation design, management interface unit 154 (FIG. 1) may provide the operator with the following data:

a. RRU locations 1202 b. The BTS farm cell resource vector of each sector $Si(C1 \ldots Cn)$ (1204)

c. Transceivers and cable constraints vector 910 (FIG. 9)

d. RRU Isolation table 1300 shown in FIG. 13 e. Outdoor macro network signals penetration/interference table 1400 shown in FIG. 14 f. Offload capacity resources vector 1102

Based on all this data, the operator may perform the design of capacity allocation in the building at 1206 FIG. 12. The operator may also perform an initial design, allocate cell resources, and turn the system on. The system will then present to the operator the data traffic measurement vectors 902 (FIG. 9) in step 1208. If there are capacity issues, and there are locations or hotspots in which the resource allocation does not suffice, the operator may modify the design or add cell resources in the central BTS farm or add offload devices in the high capacity demand zones in 1210.

The operator may alter the static capacity allocation mode using preset system time dependent configurations. This mode is an enhancement to the aforementioned static capacity allocation modes. In this mode, the operator may manually define one or more capacity allocation configuration vectors such as 912 or 916 in FIG. 9, based on the data presented to him and prior knowledge of upcoming events such as predicted peak vector 906 in FIG. 9. Each such configuration vector 912 or 916 has different cell resource routing maps. These configurations are stored in the DCC-DAS memory which may reside in MSDH 130 processor 602 or in DCC-DAS controller 150 and may be activated automatically based on time of day or based on specific dates. The different modes can also be activated based on event driven manual interrupts performed by the operator through the DAS Controller 150. All the programming of these modes can be done locally using management interface 154 shown in FIG. 1 or remotely using cellular modems or an internet connection.

MIMO Capability

The key to good MIMO performance is total separation of the MIMO links throughout the DAS or IBW (In Building Wireless) system from the antenna all the way down to the BTS's. Current DAS systems either separate fibers or coax cables for each MIMO link or achieve the separation by mixing down the two paths to separate IF frequencies. Special attention should be paid to the delay issues. One skilled in the art knows that it is recommended to keep the system symmetrical to achieve the same delays. This creates a heavy burden on the in-building designers and is a source of inflexibility.

DCC-DAS 100 may enable the use of the same fibers/cables and same MSDH unit by simply using a dedicated MIMO MTDI and independent cell resource data samples for each MIMO link which can be routed as a separate resource.

Figure 15:
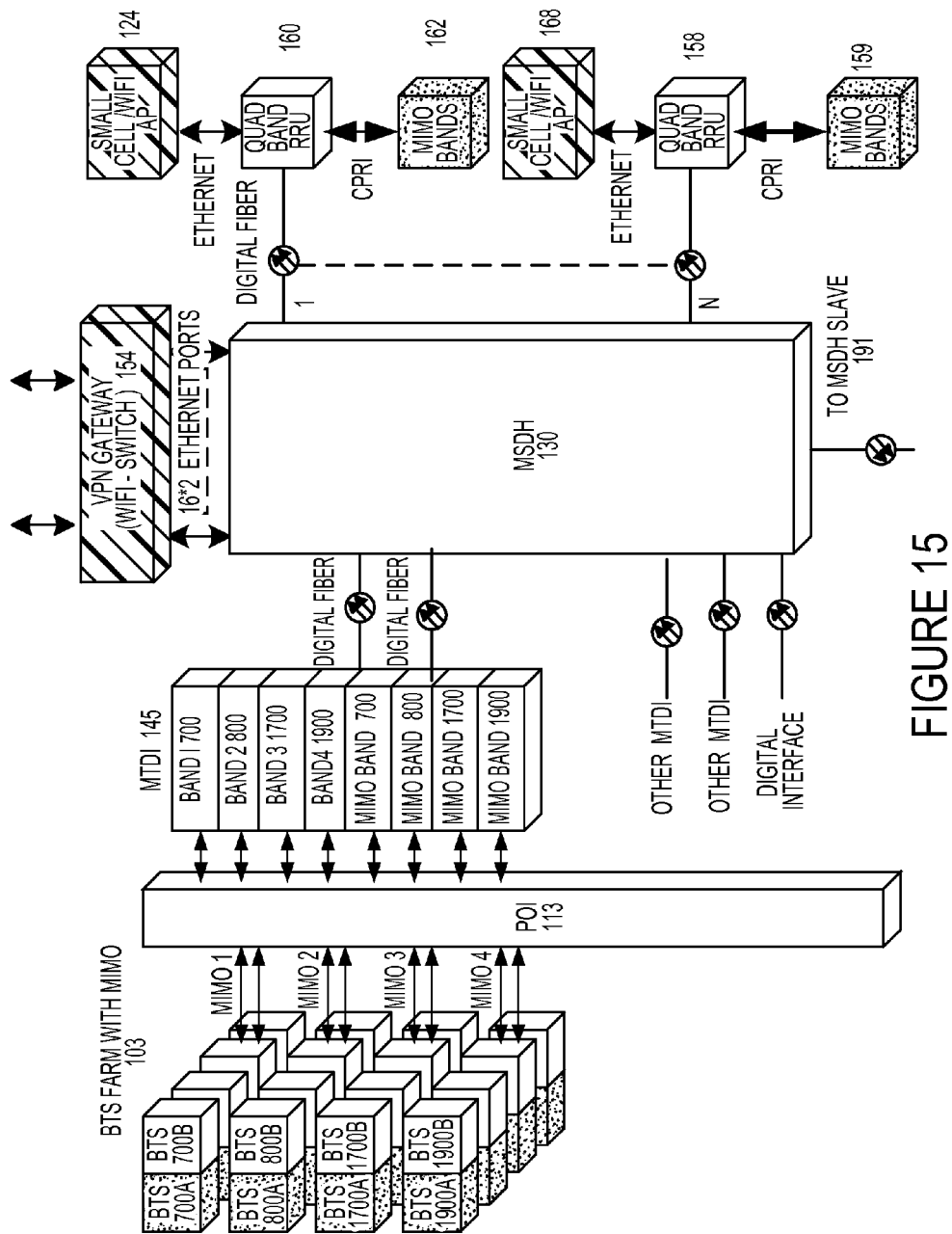
FIG. 15 depicts a MIMO configuration of the DCC-DAS.

FIG. 15 depicts how MIMO capability can simply be added to the system. FIG. 15 shows a BTS farm 103 covering for example the four US bands 700/800/1700/1900 and in each band the BTSs have first (A port) and second (B port) MIMO ports. The A&B MIMO ports of the of BTS farm 103 are now separately combined by a passive combiner POI 113 (POI—point of interface) and connected to a MIMO dedicated MTDI 145. This MTDI has now 8 bands. Four of the bands are allocated to the A ports of the 700/800/1700/1900 bands and the other four B ports, respectively. The MTDI digitizes the signals in the 8 bands and passes them through a digital filter bank which consists of digital filters for all the relevant A and B MIMO cell resources. The output of the filter banks is now converted to a stream of A and B cell resource data samples. Each such cell resource data sample can be identified in the system as an independent cell resource (e.g. by means of a header and CRC). This independent identification enables MSDH 130 to differentiate between the MIMO stream of data A and the MIMO stream of data B. The A&B digitized signals are now routed by the MSDH 130 to the relevant RRUs where MIMO function is required. Since the A and B MIMO output of each BTS cell resource are represented as independent cell resource data samples by the MTDI they can be routed on the same cable to the RRU's. RRU 158 for examples receives the combined A&B MIMO data (Through transceiver 702 in FIG. 7) The 704 processor embedded in each RRU (see FIG. 7) splits between the A MIMO signals and B MIMO signals and sends the A MIMO signals to main Quad band 700/800/1700/1900 RRU 158 and the B MIMO signals to the transceiver 726 (FIG. 7) to the separate MIMO B RRU 159. This process saves the extra cable which is required by current state of the art systems between the MSDH 130 and the two RRUs 158,159.

In both downlink and uplink, MSDH 130 processes all the MIMO related signals. Since they are all digital signals they may be buffered temporarily and thus provide variable delays to the various signals coming from the various RRUs so that when they are combined and transmitted to the BTS they are fully synchronized. This method is far more accurate than any other analog method. These delays may also be implemented in the RRUs. The round-trip delays through the cabling may be measured by the data link blocks 606 to determine the required values of the variable delays. This technique of digitally delaying and synchronizing the MIMO A&B links enables an easy implementation of diversity MIMO antennas.

MSDH 130 enables to route the MIMO signals to multiple RRUs as programmed by the operator thus a) providing an effective way to transmit MIMO signals from one point to selectable multi-points; and b) enabling the operator to select the zones to which the MIMO signals will be routed and consequently increase the capacity in those selected floors. The operator can then program the system and store these various MIMO configurations in the system memory This architecture teaches an easy way to add MIMO capability to the DCC-DAS. All one has to do is install MIMO A RRU (158 in FIG. 15) with its antenna, connect a slave MIMO B RRU (159) to the main RRU 158 (FIG. 15) with digital transceiver 726 (FIG. 7) and the aforementioned slave RRU 159 to its own antenna system and program the MSDH 130 accordingly. On the other side, a specific MTDI (145—FIG. 15) has to be connected to the A&B MIMO output of one or more MIMO BTS's outputs, and to the MSDH 130 accordingly as shown in FIG. 15. The MSDH 130 has to be programmed accordingly It will be obvious to one skilled in the art that the MIMO functionality can be achieved in a variety of ways with the DCC-DAS system. For example, two different MTDIs may be used; one connected to MIMO output A and the other to MIMO output B. Similarly, a single RRU may have two separate RF connections to separate antenna systems, one for MIMO signal A and the other for MIMO signal B. Once digitized within the DCC-DAS, MIMO cell resources can be routed and manipulated in the same way as any other cell resources.

Fading Capacity Switching

Capacity routing involves the switching off or switching on of sectors or cell resources from one RRU to another. The sudden drop or rise of signal can cause undesired disconnections. MTDI 130 may use a special fading algorithm in which the switched off cell resource signal is not instantly switched off but slowly fades away while the switched on cell resource signal slowly rises. The switched on cell resource may rise before the switched off cell resource begins to decay, thus enabling a smooth handoff. This proposed algorithm simulates the way the mobile cellphone performs handover from one sector to the other in outdoor environment without any disconnections.

Adding Sectors to the DCC-DAS

Most current analog Fiber DAS are designed to support a single sector and provide limited upgrade capability when adding another sector. Adding sectors in the proposed DCC-DAS architecture is simple and programmable as shown in FIG. 1. MSDH 130 can interface through the MTDIs (142, 144, 146) to various sectors. In order to add a new sector, all one has to do is connect a new MTDI and add second sector BTSs. MSDH 130 has to be reprogrammed to reflect the fact that it has to split the two sectors. The reprogramming can be done locally through DCC-DAS controller 150 or remotely using management interface 154

Location Finding

Operators are frequently required to locate mobile users for two main reasons:

a. Security reasons—many countries are now mandating that the operator should be able to locate the mobile user when the user is dialing E911 or equivalent emergency number.
b. Commercial reasons—For advertisements, promotions etc.

Location finding can be easily achieved when the user is outdoors, particularly nowadays when most mobile phones are equipped with GPS devices. However, this capability cannot be achieved inside buildings when no GPS signals are available. The operator may know that the emergency mobile caller is in the building or campus, however he cannot tell in which zone or floor of the building he is.

The proposed network architecture of DCC-DAS 100 shown in FIG. 1 enables the operator to find out, through which RRU or in which zone the emergency mobile caller is now calling. All this is done by leveraging the switching and routing capabilities of the network and MSDH 130 in particular.

As shown in FIG. 1, BTS emulator 136 is connected to MSDH 130 through auxiliary MTDI 148. BTS emulator 136 is used especially for location purposes and the mobile devices are prevented from performing any hand off activity to this/these devices. BTS emulator 136 may be a real BTS or a repeater that emulates a BTS.

BTS emulator 136 transmits a carrier downlink with one or more signals that will cause the mobile phone to identify them. This signal is cyclically transmitted by BTS emulator 136 to each RRU in DCC-DAS 100 or to each zone accordingly. All the relevant signals have to cover all the operator or operators technologies and cells repertoire. These BTS emulator 136 signals are modulated with forbidden spreading codes or assigned special frequencies or other properties which forbid the mobile to lock on them and possibly perform handoff activity to BTS emulator 136. Thus the mobile units in each zone detect the BTS emulator signals, but will not lock on them since it is forbidden to perform any handoff activity to these signals. However, the mobile unit does report to the carrier MTSO system 183 that it received and detected the BTS emulator signal and the TOD (time of day) in which it detected the BTS emulator signals. The information will now be transferred to a special server that logs this information in the data base. This server also receives from the DAS controller 130 recordings of all BTS emulator signals together with the real time recording and the serial number of the specific RRU through which each communication was held.

Whenever there is a request to locate the mobile user, the operator has to look at the database and correlate the two recordings and find which RRU is correlated with the last report of the mobile device and the zone covered by that RRU is the zone in which the mobile was last detected. One must bear in mind that the smaller the zone which is covered by each RRU, the more accurate is the location finding of the mobile device.

Once the BTS emulator has finished visiting all the RRUs, the locations of the mobile devices are logged and the whole cycle starts all over again. The shorter the cycle is, the more up-to-date is the emergency mobile caller last location information.

Such BTS location finding emulators are well known in the market. They are sometimes called Pilot Beacons. However these pilot beacons are expensive and have to be installed in every zone in the building or near every RRU in order to accurately locate the caller. DCC-DAS 100 solves this problem leveraging the MSDH switching/routing capabilities and using just one BTS emulator 136 to sequentially scan all the RRUs.

A second method provides an alternative way of in-building location finding. It does not require any S/W change from the operator side. In this method, the operator assigns one or more special locating real BTS 190 who is able to generate all the operator technologies and cells. This time it is a real BTS with such spreading codes frequencies etc. that allows the mobile to lock on them.

This locating BTS starts scanning the RRUs, one RRU at a time. Once the locating BTS reaches a certain RRU, all the mobile phones in that zone covered by that RRU are made to handover to the locating BTS. The locating BTS will register all the mobile phones and record the time of occurrence and location of the RRU. It will then switch off (may use the fading mechanism) and visit another RRU thus forcing the mobile phones to revert back to the original BTS it was communicating with, before the interrupt of the "locating BTS." When the locating BTS completes scanning all the RRU's it knows exactly which mobile phone was in which RRU area and at what time of day. This data is constantly logged in the operator data base. Whenever there is an E911 call, all the operator has to do is look at the data base and find the latest location of the specific mobile phone.

When the mobile device dials E911 and the operator receives the call, he knows from which mobile device it was sent, and all that the operator has to do now is read the data from that locating BTS.

The advantage of this process is that it does not require any special software or any special effort from the operator. It actually follows the same process that is performed outdoors. The disadvantage of this process is that it performs quite a few handoffs whenever it arrives in each RRU which may overload the operator's network.

Some operators may be reluctant to use this methodology on a continuous basis. In order to alleviate the problem, it is suggested that this process is performed only in an emergency case and/or upon request only, and not on a continuous basis. In this case, only when there is an E911 call received in the building the operators will activate this locating BTS and start scanning the RRU's. Thus in a very short time the operator will know to which RRU the mobile device that dialed E911 belongs and hence know the location of this mobile user. In order to expedite the process a few locating BTS's may be deployed, each one scanning different parts of the building or campus. One should bear in mind that it is not necessary to add specific locating BTS to the DCC-DAS. One or more of the BTS from the main BTS farm can be allocated temporarily to this task in case of emergency.

In order to expedite the process, two or more of the BTS's may be allocated to this location finding scanning process, thus reducing the amount of time required to locate the mobile user who is in distress.

Location Finding in the Presence of Offload Devices

As aforementioned, offload devices are an integral part of DCC-DAS 100. The mobile phones may be directed to handover and register to the offload devices. The offload device may inform either the MSDH 130 or internet gateway 192 of its location and the mobiles phones that are connected to it. The list of the mobile phones who registered to each offload device together with the location of the offload device may be sent to the DCC-DAS controller 150. The information is added to the information gathered by the BTS emulator 136 or the locating BTS 190.

In the event that detailed capacity measurements are implemented in the system (for example in the RRU's), this measurement information may also be used to perform or assist in the process of location finding. A mobile uplink transmission may be identified by its time and frequency, and also by its spreading code in spread-spectrum systems such as CDMA. The traffic logs from the capacity measurements may be cross-correlated with information from the main BTS farm and the operator network in order to determine through which RRU(s) an uplink signal is being received. Accurate arrival time measurements at the RRU's can potentially be used to provide finer grained location measurements by triangulating the user within the coverage areas.

Selective Prevention of Cellular Services Capability

The operators are often confronted with the need to jam or mask certain zones in the building in order to prevent the mobile users from generating calls in those zones. Some scenarios that may necessitate jamming include:
 a. A DCC-DAS in a prison may be required to provide coverage to certain parts of the prison and prevent coverage from other parts.
 b. Exam rooms in schools.
 c. Convention centers in time of lectures.

The DCC-DAS architecture provides the capability to route cellular jammer signals to specific zones in the building while at the same providing high quality coverage to other parts of the building.

Jammer 138 is connected to MSDH 130 through auxiliary MTDI 148. The Auxiliary MTDI filter bank is programmed so that there are specific digital filters allocated to pass only the specific jam resource signals and reject any other signal. A jam resource signal is defined as a specific jamming signal, modulated to jam specific wireless technology, occupying a contiguous piece of spectrum which covers one or more of the carrier's cell resource signals who are supposed to be jammed.

MSDH 130 routes the jam resource signals to the selected RRUs that cover those zones that are supposed to be jammed and preventing other cell resources from being routed to those selected RRUs. Thus, one jammer 138 can cover a complete campus while leveraging the routing capabilities of the MSDH 130.

One skilled in the art would realize that the DCC-DAS 130 can transport any external source such as FM Radio or Audio break-in signals etc., in the same way it transports a jammer signal. An auxiliary MTDI would digitize the signals of the FM radio or other auxiliary source, allocate a digital filter to the relevant cell resources, filter with one of the digital filters in the digital filter bank, and route the output of that digital filter to the desired RRUs. Once digitized, the auxiliary signals can be treated in the same way as any other digitized cell resource except that the signal may be unidirectional, for example there may only be a downlink signal as would be the case for broadcast FM radio signals. All this is valid provided that the frequency range of the auxiliary source lies within the operating frequency range of the AUX MTDI 148 and the relevant RRUs, and that there is sufficient data capacity and processing capacity available.

We claim:

1. A digital distributed antenna system (DAS) for coupling to output ports of a plurality of base transceiver stations (BTS's) comprising:
 a plurality of remote radio units (RRUs) in communication with mobile devices;
 a central digital hub for routing and processing digital RF signals, wherein the central digital hub is coupled to the RRUs and to the BTS's;
 at least one uplink digital filter bank comprising a plurality of uplink digital fitters, such digital filter bank in the plurality of the RRUs; and
 at least one downlink digital filter bank comprising a plurality of downlink digital filters,
 each of the plurality of downlink digital filters being matched to a unique cell resource, a cell resource comprising a band of contiguous frequencies within a frequency spectrum owned by an operator, and each cell resource including at least one or more downlink signals being received from one or more of the BTS's,
 and each of the plurality of uplink digital filters being matched to a unique cell resource, each cell resource including at least one or more signals being received from one or more mobile devices in an uplink direction, there being at least two separate and distinct cell resources;
 wherein, in the downlink direction, the DAS multiplexes one or more downlink signals and further comprises a digitizing module for digitizing any downlink signal that is an analog RF signal,
 wherein the DAS filters the digital one or more downlink signals on a cell resource basis with the downlink digital filter bank and allocates an individual routing path to each of the downlink cell resources to one or more RRUs,
 wherein each downlink digital filter is allocated a distinct individual transfer function to match the cell resource it is filtering, and
 wherein the routing of each digital downlink cell resource is performed according to software programmable routines in the central digital hub to provide individual routing for each downlink cell resource to one or more RRUs for transmission to connected mobile devices,
 wherein, in the uplink direction, the one or more RRUs receive one or more uplink RF signals, digitizes the one or more uplink signals, filters the digitized one or more uplink signals on a cell resource basis with the uplink digital filter bank,
 wherein each uplink digital filter is allocated a distinct individual transfer function to match the cell resource it is filtering, and
 wherein the central digital hub allocates an individual routing path to each of the digitized uplink cell resources to an individual BTS according to software programmable routines in the central digital hub to provide individual routing of path for each cell resource to a BTS.

2. The digital DAS according to claim 1, wherein an amount of downlink data and noise routed to the RRUs by the central digital hub is reduced by routing only the digital filtered cell resources and not all of the RF spectrum assigned to the one or more operators, and wherein an amount of uplink data and noise routed to the BTS's by the central digital hub is reduced by routing only the filtered cell resources and not all of the RF spectrum assigned to the one or more operator uplink signals.

3. The digital DAS according to claim 1, wherein the DAS provides a specific gain to each of the cell resources.

4. The digital DAS according to claim 1, wherein additional uplink noise measurements or estimation functions are performed in each uplink digital filter correlated to each cell resource in the uplink digital filter bank, and wherein an alarm is sent to the DAS whenever a noise level measured in one or more of the cell resources in the u, digital filter bank exceeds a predefined threshold value.

5. The digital DAS according to claim 1, wherein the software programmable routines enable modification of the DAS by:
adding one or more cell resources in the downlink direction and routing the one or more added cell resources to the relevant RRUs.

6. The digital DAS according to claim 1,
wherein the one or more cell resources may be interfaced with them external world in a digital format, and
wherein each individual filtered digital cell resource is packetized and assigned a header prior to being routed by the central digital hub so that the central digital hub can allocate an individual specific routing path to each cell resource.

7. The digital DAS according to claim 1, wherein all DAS configurations can be programmed locally or from remote.

8. The digital DAS according to claim 1,
wherein one or more digitized MIMO channels can be treated as separate and independent digitized cell resources by the DAS and transmitted over the same channels or routed to a selected one or more RRUs, and
wherein the DAS comprises routing delay software routines that allows the DAS to set an individual digital delay for one or more routing paths of the filtered cell resources in order to compensate for routing delays, propagation delays, and enable the proper synchronization amongst two or more RRUs required for MIMO links.

9. The digital DAS according to claim 1, wherein the central digital hub can route both the filtered cell resources and additional IP backhaul data for auxiliary devices, thereby allowing the DAS to serve as a backhaul infrastructure for small cells, surveillance cameras, or Wi-Fi access points which are installed in or near various zones which are covered by the DAS.

10. The digital DAS of claim 1, further comprising:
at least one BTS, BTS emulator, pilot beacon, or any locating device,
wherein a signal from the locating device is treated as a separate and independent cell resource by the central digital hub and can be routed to one or more selected RRUs in order to verify if a certain mobile user is located in the area covered by the said one or more RRUs.

11. The digital DAS according to claim 1, wherein a selected one or more BTS cell resources may be routed sequentially through one or more RRUs in order to locate the RRU from which one or more E911 calls emanated.

12. The digital DAS according to claim 1, wherein at least one RRU comprises:
a downlink sniffer receiver which enables a measurement or estimation of the minimal cross isolation between the antenna of the one RRU with that of the other antenna coupled to the other RRUs in the DAS and a measurement of a penetration level of any signal from sources internal or external to the DAS.

13. The digital DAS according to claim 1, wherein the central digital hub collects one or more RRU data traffic measurements, tracks sequential traffic measurements calculates data traffic estimators, and provides reports to a user about present and estimated data the data traffic in the one or more RRUs,
wherein the central digital hub, with the use of optimization algorithms and the data traffic measurements, automatically reroutes one or more cell resources accordingly in order to provide response to varying capacity demands in the DAS or wherein the user can reroute locally or from remote one or more cell resources accordingly in order to provide response to varying capacity demands in the DAS, and
wherein the optimization algorithms utilizes the presence of offloading devices coupled to the central digital hub.

14. The digital DAS according to claim 13, wherein each RRU is coupled to the central digital hub via a transceiver, and
wherein capacity constraints of the transceivers and the links between the transceivers are read by the central digital hub and the capacity routing is optimized so as not to exceed the capacity constraints of each transceiver.

15. Digital distributed antenna system (DAS) comprising:
a plurality of remote radio units (RRUs) in communication with mobile devices;
a plurality of base transceiver stations (BTS's);
a central hub coupled to the RRUs and the BTS's; and
a digital filter bank comprising one or more digital titters,
each digital filter being matched to a unique cell resource, a cell resource including a band of contiguous frequencies within a frequency spectrum and including at least one or more downlink signals being received from one or more of the BTS's, and
each digital filter being matched to a unique cell resource, a cell resource including a band of frequencies within a frequency spectrum and including at least one or more signals being received from one or more mobile devices;
wherein, in a downlink direction, the DAS multiplexes one or more downlink signals and further comprises a digitizing module for digitizing any downlink si mal that is an analog RF signal, and filters the digital one or more downlink signals on a cell resource basis with a digital filter bank, wherein each filter in the digital filter bank is allocated a distinct individual transfer function to match the cell resource it is filtering,
wherein the central hub routes the resulting digitized filtered cell resources to one or more RRUs according to pre-programmed routines in the central hub to provide individual routing of each cell resource to RRUs for transmission to their mobile devices,
wherein, in an uplink direction, the DAS multiplexes one or more uplink RE signals, digitizes the one or more uplink signals, and filters the digitized one or more uplink signals on a cell resource basis with a digital filter bank, wherein each filter in the digital filter bank is allocated a distinct individual transfer function to match the cell resource it is filtering, and
wherein the central hub routes the resulting digitized filtered cell resources to one or more BTS's according to pre-programmed routines in the central hub to provide individual routing of each cell resource to BTS's,
wherein each RRU is coupled to the central hub via a transceiver, and
the central hub provides warning to an operator whenever a rerouting process exceeds a capacity constraint of each individual transceiver.

16. The digital DAS according to claim 1,
wherein a user can manually input information that will cause the central digital hub to reroute cell resources or groups of BTS's forming sectors,
wherein the input information comprises a date, a time of day, or planned events, and
wherein the user can manually input the information locally or from a remote location via wireless or wireline communication.

17. The digital DAS according to claim 1, wherein any software defined cell resources rerouting routines by the central digital hub is not performed as a step function but is controlled by a fading algorithm in which one or more cell resources decays while new cell resources rises to simulate a handoff.

18. A method for routing cell resources through a central digital hub of a digital distributed antenna system (DAS), said central digital hub is coupled to a plurality of remote radio units (RRUs) and to output ports of a plurality of base transceiver stations (BTS's), in a downlink direction the method comprising:
receiving and multiplexing one or more downlink signals from one or more base transceiver stations (BTS's), and, if the downlink signals are analog RF signals, digitizing the analog RF signals before multiplexing them;
filtering the one or more digital downlink signals on a cell resource basis using a downlink digital filter bank comprising one or more downlink digital filters, each downlink digital filter being matched to a unique cell resource,
a cell resource including a band of contiguous frequencies within a frequency spectrum owned b an operator and including at least one or more downlink RF signals being received from one or more of the BTS's in a downlink direction, and including at least one or more signals being received from one or more mobile devices in an uplink direction;
routing the filtered downlink cell resources to a plurality of RRUs according to software programmable routines in the central digital hub to provide individual routing for each cell resource to the plurality of RRUs for transmission to connected mobile devices, there being at least two separate and distinct cell resources;
and, in an uplink direction, the method comprising:
at each RRU,
receiving one or more uplink RF signals from one or more mobile devices;
digitizing the one or more uplink signals;
filtering the one or more uplink signals on a cell resource basis using an uplink digital filter bank comprising a plurality of uplink digital filters, each uplink digital filter being matched to a unique cell resource; and
routing the filtered cell resources through the central digital hub to one or more BTS's according to routines in the central digital hub.

19. The digital DAS according to claim 1, wherein the software programmable routines are manually pre-programmed or are software defined routings.

20. The digital DAS according to claim 1, wherein the two separate and distinct cell resources do not overlap.

21. The digital DAS according to claim 2,
wherein additional uplink noise measurements or estimation functions are performed in each uplink digital filter correlated to each cell resource in the uplink digital filter bank, and
wherein a different routing or transfer function may also be allocated to an uplink digital filter when excessive noise is measured or estimated in said uplink digital filter.

22. The digital DAS according to claim 1, wherein the software programmable routines enable modification of the DAS by:
rerouting one or more existing downlink cell resources or a group of BTS's forming a BTS sector, to one or more RRUs or adding one or more RRUs and rerouting one or more downlink cell resources accordingly; and
rerouting one or more existing uplink cell resources or complete RRUs to one or more BTS's and or adding one or more BTS's and rerouting one or more uplink cell resources accordingly.

23. The digital DAS according to claim 1, wherein the central digital hub collects one or more RRU data traffic measurements, tracks sequential traffic measurements calculates data traffic estimators, and provides reports to a user about present and estimated data the data traffic in the one or more RRUs,
wherein the central digital hub, with the use of optimization algorithms and the data traffic measurements, automatically reroutes one or more cell resources accordingly in order to provide response to varying capacity demands in the DAS or wherein the user can reroute locally or from remote one or more cell resources accordingly in order to provide response to varying capacity demands in the DAS, and
wherein the optimization algorithms take into consideration upcoming events or special times of day in which peak capacity demand is expected and allocates cell resources accordingly.

24. The digital DAS according to claim 1,
wherein additional uplink noise measurements or estimation functions are performed in one or more uplink digital filters correlated to each cell resource in the uplink digital filter bank, and,
wherein a different routing or gain may be allocated to a digital filter when excessive noise is measured or estimated in said digital filter.

25. The digital DAS according to claim 1,
wherein the one or more cell resources may be interfaced with an external world BTS in a digital format, and
wherein each digital cell resource is packetized and allocated a specific routing path, and wherein the central digital hub or RRU is coupled to auxiliary devices, thereby allowing the DAS to serve as a backhaul infrastructure for digital format cell resources.

26. The digital DAS according to claim 1, wherein any software defined cell resources rerouting routines by the DAS is performed by a fading algorithm in which a rerouting cell resource decays after a new rerouting cell resources rises to simulate a handoff.

27. The digital DAS according to claim 1, wherein each RRU is coupled to the central digital hub via a transceiver, and
wherein capacity constraints of the transceivers and the links between the RRU and central digital hub are monitored so as not to exceed the capacity constraints of each transceiver or link whenever a cell resource routing or rerouting process is performed.

* * * * *